(12) United States Patent
Spielman et al.

(10) Patent No.: US 11,126,188 B2
(45) Date of Patent: Sep. 21, 2021

(54) SYSTEM AND METHOD FOR MAINTAINING A WORK SURFACE AT A WORKSITE

(71) Applicant: Caterpillar Inc., Deerfield, IL (US)

(72) Inventors: Michael A. Spielman, Brookfield, IL (US); John L. Marsolek, Watertown, MN (US); Timothy M. O'Donnell, Long Lake, MN (US)

(73) Assignee: Caterpillar Inc., Peoria, IL (US)

( * ) Notice: Subject to any disclaimer, the term of this patent is extended or adjusted under 35 U.S.C. 154(b) by 248 days.

(21) Appl. No.: 16/383,905

(22) Filed: Apr. 15, 2019

(65) Prior Publication Data
US 2020/0326713 A1  Oct. 15, 2020

(51) Int. Cl.
G05D 1/02 (2020.01)
E02F 9/20 (2006.01)

(52) U.S. Cl.
CPC ......... *G05D 1/0214* (2013.01); *E02F 9/2045* (2013.01); *G05D 1/0212* (2013.01); *G05D 1/0231* (2013.01); *G05D 1/0238* (2013.01); *G05D 1/0255* (2013.01); *G05D 1/0257* (2013.01); *G05D 1/0278* (2013.01); *G05D 2201/0202* (2013.01)

(58) Field of Classification Search
CPC .. G05D 1/0214; G05D 1/0238; G05D 1/0212; G05D 1/0255; G05D 1/0278; G05D 1/0257; G05D 1/0231; G05D 2201/0202; E02F 9/2045
See application file for complete search history.

(56) References Cited

U.S. PATENT DOCUMENTS

| | | | |
|---|---|---|---|
| 5,025,150 A * | 6/1991 | Oldham | G01T 7/00 250/253 |
| 5,464,066 A * | 11/1995 | Doucet | A01B 31/00 172/1 |
| 5,684,696 A | 11/1997 | Rao et al. | |
| 6,363,632 B1 | 4/2002 | Stentz et al. | |
| 6,539,294 B1 * | 3/2003 | Kageyama | E02F 3/842 180/168 |
| 7,079,943 B2 * | 7/2006 | Flann | G01C 21/005 701/423 |
| 7,516,563 B2 | 4/2009 | Koch | |
| 8,364,353 B2 * | 1/2013 | Kiegerl | E02F 9/205 701/50 |

(Continued)

*Primary Examiner* — Dale W Hilgendorf
(74) *Attorney, Agent, or Firm* — Lee & Hayes, PLLC

(57) ABSTRACT

A method includes receiving a worksite plan to be executed by a machine at a worksite, and determining first travel parameters of the machine. Such first travel parameters include a first travel path along a work surface, and first work tool positions. The method also includes controlling the machine to traverse at least part of the first travel path, receiving sensor information associated with the work surface, and identifying an imperfection of the work surface located along the first travel path. The method further includes determining second travel parameters of the machine. Such second travel parameters including a second travel path along the work surface, and second work tool positions. The method also includes controlling the machine to traverse at least part of the second travel path while positioning the work tool according to at least one of the second work tool positions.

18 Claims, 3 Drawing Sheets

(56) References Cited

U.S. PATENT DOCUMENTS

| | | | |
|---|---|---|---|
| 8,386,110 B2* | 2/2013 | Maekawa | G05D 1/0217 |
| | | | 701/23 |
| 9,234,329 B2 | 1/2016 | Jaliwala et al. | |
| 10,119,244 B2* | 11/2018 | Elkins | G05D 1/0212 |
| 10,228,454 B2* | 3/2019 | Uotsu | G01S 13/931 |
| 2004/0158355 A1 | 8/2004 | Holmqvist et al. | |
| 2016/0282465 A1* | 9/2016 | Sherlock | G01S 13/862 |
| 2017/0010619 A1* | 1/2017 | Foster | B60T 7/00 |
| 2017/0131718 A1* | 5/2017 | Matsumura | G05D 1/021 |
| 2018/0135273 A1 | 5/2018 | Tsuji | |
| 2018/0171590 A1 | 6/2018 | Kean | |
| 2018/0210454 A1* | 7/2018 | Ready-Campbell | G06T 17/05 |
| 2020/0032490 A1* | 1/2020 | Ready-Campbell | |
| | | | G05D 1/0088 |

* cited by examiner

SYSTEM AND METHOD FOR MAINTAINING A WORK SURFACE AT A WORKSITE

TECHNICAL FIELD

The present disclosure relates to a system and method for maintaining a work surface at a worksite. More specifically, the present disclosure relates to a system including one or more machines at a worksite, wherein at least one of the machines is configured to interact with an imperfection of the work surface.

BACKGROUND

Haul trucks, wheel loaders, skid steer loaders, dozers, and other machines are often used to perform a variety of tasks at a worksite. For example, one or more dozers may be used to remove a layer of gravel, concrete, asphalt, soil, or other material making up part of a work surface at the worksite. In some examples, a dozer may form a mound or pile of the removed material at a first location of the work site, and a wheel loader or other such machine may be configured to move the pile of removed material from the first location to a dump zone, a haul truck, or any other second location at the worksite. In such examples, the wheel loader may be controlled (e.g., manually by an operator, semi-autonomously, fully-autonomously, etc.) to traverse a travel path defined by the work surface and extending from a current location of the wheel loader to the location of the pile.

In some instances, the wheel loader or other such machine may encounter a ditch, a rut, a pothole, a build-up of material, or other work surface imperfection along the travel path. In some examples, the operator of a manually-controlled wheel loader may take corrective action to modify such an imperfection (e.g., clear or smooth over a build-up of material, at least partially fill a ditch, rut, or pothole, etc.) while traversing the travel path, thereby returning the work surface to a substantially flat condition. However, semi-autonomous or fully-autonomous machines may not be configured to perform such maintenance tasks.

An example system for controlling the movement of a machine is described in U.S. Patent Application Publication No. 2004/0158355 (hereinafter referred to as the '355 reference). In particular, the '355 reference describes a system for controlling autonomous load-handling vehicles, such as wheel loaders, operating in a construction environment. As explained in the '355 reference, a vehicle may be equipped with a laser optic system for determining the position of the vehicle. Outputs from the laser optic system may be used for autonomous vehicle navigation, and as reference for on-board terrain mapping sensors. The vehicle described in the '355 reference may also utilize a dynamic terrain model for planning and analyzing vehicle travel paths, for detecting and avoiding obstacles, and for optimizing the movement of a vehicle implement during loading and unloading operations. The '355 reference does not, however, describe a system configured to control machine and tool movement in order to maintain a substantially flat work surface for safe and efficient machine travel. For instance, upon identifying an imperfection of the work surface, the '355 reference does not describe controlling the machine to take corrective action in order to return the work surface to a substantially flat condition. As a result, and to avoid encountering such imperfections, the machines described in the '355 reference may be caused to traverse relatively indirect travel paths while performing a task at the work site. Such indirect travel paths may increase the time and resources required to perform such tasks, thereby reducing efficiency.

Example embodiments of the present disclosure are directed toward overcoming the deficiencies described above.

SUMMARY

In an example embodiment of the present disclosure, a method includes receiving, with a controller, a worksite plan to be executed by a machine at a worksite, and determining, with the controller and based at least partly on the worksite plan, first travel parameters of the machine. Such first travel parameters include a first travel path along a work surface of the worksite, and first work tool positions associated with a work tool of the machine. The method also includes controlling, with the controller, the machine to traverse at least part of the first travel path while positioning the work tool according to at least one of the first work tool positions. The method further includes receiving sensor information with the controller, at least a portion of the sensor information being associated with the work surface defining the first travel path, and identifying, with the controller and based at least partly on the sensor information, an imperfection of the work surface located along the first travel path. The method also includes determining, with the controller and based at least partly on identifying the imperfection, second travel parameters of the machine. Such second travel parameters include a second travel path along the work surface, and second work tool positions associated with the work tool. The method further includes controlling, with the controller, the machine to traverse at least part of the second travel path while positioning the work tool according to at least one of the second work tool positions.

In another example embodiment of the present disclosure, a system includes a machine configured to travel along a work surface of a worksite, the machine having a work tool configured to carry material as the machine travels along the work surface. The system also includes a first sensor configured to determine a location of the machine at the worksite, a second sensor configured to determine one or more characteristics of the work surface as the machine travels along the work surface, and a controller in communication with the first sensor and the second sensor. In such examples, the controller is configured to determine a first travel path of the machine along the work surface, control the machine to traverse at least part of the first travel path, and receive sensor information from the first sensor and the second sensor, at least a portion of the sensor information being associated with the work surface defining the first travel path. The controller is also configured to identify an imperfection of the work surface located along the first travel path based at least partly on the sensor information, and determine a second travel path of the machine along the work surface based at least partly on identifying the imperfection. The second travel path extends, at least in part, from a current location of the machine to a location of a pile of material at the worksite. The controller is further configured to control the machine to traverse at least part of the second travel path.

In yet another example embodiment of the present disclosure, a system includes a machine configured to travel along a work surface of a worksite, the machine having a work tool configured to carry material as the machine travels along the work surface. The system also includes a sensor carried by the machine and configured to determine one or more characteristics of the work surface as the machine travels along the work surface, a controller carried by the machine and in communication with the sensor, and a communication device carried by the machine, in communication with the controller, and connected to a network. The system further includes a control system in communication with the controller via the network and the communication device. In such examples, the controller is configured to receive, from the control system and via the network, a worksite plan to be executed by the machine, the worksite plan identifying a location of a pile of material disposed at the worksite. The controller is also configured to receive sensor information from the sensor, at least a portion of the sensor information being associated with a first travel path of the machine along the work surface, the first travel path extending, at least in part, from a current location of the machine to the location of the pile. The controller is further configured to identify an imperfection of the work surface located along the first travel path based at least partly on the sensor information, and to determine a second travel path of the machine along the work surface based at least partly on identifying the imperfection. In such examples, the second travel path extends, at least in part, from the current location of the machine to the location of the pile. The controller is also configured to control the machine to traverse at least part of the second travel path.

DETAILED DESCRIPTION

Figure 1:
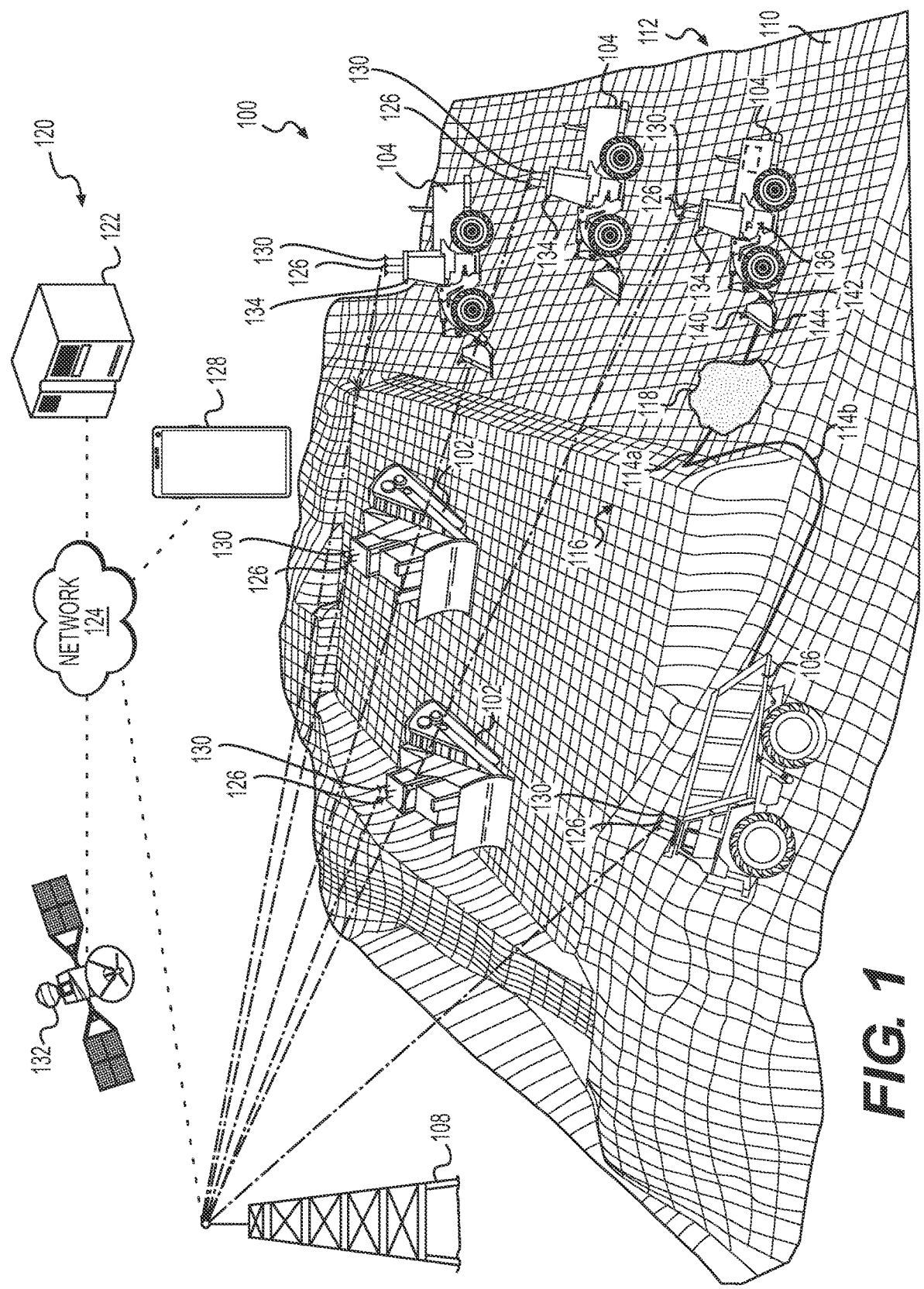
FIG. 1 is a schematic illustration of a system in accordance with an example embodiment of the present disclosure.

Wherever possible, the same reference numbers will be used throughout the drawings to refer to the same or like parts. Referring to FIG. 1, an example system 100 may include one or more machines operating at a worksite 112 to perform various tasks. For example, the system 100 may include one or more digging machines 102, one or more loading machines 104, one or more hauling machines 106, one or more transport machines (not shown), and/or other types of machines used for construction, mining, paving, excavation, and/or other operations at the worksite 112. Each of the machines described herein may be in communication with each other and/or with a local or remote control system 120 by way of one or more central stations 108. The central station 108 may facilitate wireless communication between the machines described herein and/or between such machines and, for example, a system controller 122 of the control system 120, for the purpose of transmitting and/or receiving operational data and/or instructions.

A digging machine 102 may refer to any machine that reduces material at the worksite 112 for the purpose of subsequent operations (i.e., for blasting, loading, hauling, and/or other operations). Examples of digging machines 102 may include excavators, backhoes, dozers, drilling machines, trenchers, drag lines, etc. Multiple digging machines 102 may be co-located within a common area at the worksite 112 and may perform similar functions. For example, one or more of the digging machines may move soil, sand, minerals, gravel, concrete, asphalt, overburden, and/or other material comprising at least part of a work surface 110 of the worksite 112. As such, under normal conditions, similar co-located digging machines 102 may perform about the same with respect to productivity and efficiency when exposed to similar site conditions.

A loading machine 104 may refer to any machine that lifts, carries, loads, and/or removes material that has been reduced by one or more of the digging machines 102. In some examples, a loading machine 104 may remove such material, and may transport the removed material from a first location at the worksite 112 to a second location at the worksite 112. Examples of a loading machine 104 may include a wheeled or tracked loader, a front shovel, an excavator, a cable shovel, a stack reclaimer, or any other similar machine. One or more loading machines 104 may operate within common areas of worksite 112 to, for example, load reduced materials onto a hauling machine 106. For example, the loading machines 104 described herein may traverse one or more travel paths 114a, 114b . . . 114n (where "n" implies any number of additional travel paths) (collectively referred to herein as "travel paths 114") at least partly defined by the work surface 110. Such travel paths 114 may include one or more partially or completely formed roads, bridges, tracks, paths, or other surfaces formed by the work surface 110 and passable by the construction, mining, paving machines, and/or other example machines described herein. In the example shown in FIG. 1, one such travel path 114a may extend from a current location of a loading machine 104 to a pile 116 or other collection of material removed by the one or more digging machines 102 at the worksite 112. In such examples, another such travel path 114b may extend from the pile 116 of material to a waiting hauling machine 106 disposed at the work site 112.

As will be described in greater detail below, in some examples, one or more ditches, ruts, potholes, build-ups or piles of material, or other imperfections 118 may be disposed on or formed by the work surface 110. In some such examples, and as shown in FIG. 1, an imperfection 118 may be located along one or more travel paths 114 of the loading machine 104 or other machines described herein. In such examples, the system 100 may be configured to identify the imperfection 118, and to determine various travel parameters of the machine (e.g., an alternate travel path, a travel speed of the machine, etc.) based at least partly on identifying the imperfection 118. Controlling the machine to operate based on such travel parameters may reduce the time and resources required for the machine (e.g., the loading machine 104) to accomplish a desired task, may reduce the risk of damage to the machine, and may improve the overall efficiency of the system 100. Controlling the machine to operate based on such travel parameters may also reduce the risk of harm or injury to an operator of the machine. Under normal conditions, similar co-located loading machines 104 may perform about the same with respect to productivity and efficiency when exposed to similar site conditions.

A hauling machine 106 may refer to any machine that carries the excavated materials between different locations within worksite 112. Examples of hauling machines 106 may include an articulated truck, an off-highway truck, an on-highway dump truck, a wheel tractor scraper, or any other similar machine. Laden hauling machines 106 may carry overburden from areas of excavation within worksite 112, along haul roads to various dump sites, and return to the same or different excavation areas to be loaded again. Under normal conditions, similar co-located hauling machines 106 may perform about the same with respect to productivity and efficiency when exposed to similar site conditions.

With continued reference to FIG. 1, in some examples the control system 120 and/or the system controller 122 may be located at a command center (not shown) remote from the worksite 112. In other examples, the system controller 122 and/or one or more components of the control system 120 may be located at the worksite 112. Regardless of the location of the various components of the control system 120, such components may be configured to facilitate communications between, and to provide information to, the digging machines 102, loading machines 104, hauling machines 106, and/or other machines of the system 100. In any of the examples described herein, the functionality of the system controller 122 may be distributed so that certain operations are performed at the worksite 112 and other operations are performed remotely (e.g., at the remote command center noted above). For example, some operations of the system controller 122 may be performed at the worksite 112, on one or more of the digging machines 102, one or more of the loading machines 104, one or more of the hauling machines 106, etc. It is understood that the system controller 122 may comprise a component of the system 100, a component of one or more of the machines disposed at the worksite 112, a component of a separate mobile device (e.g., a mobile phone, a tablet, a laptop computer, etc.), and/or the control system 120.

The system controller 122 may be an electronic controller that operates in a logical fashion to perform operations, execute control algorithms, store and retrieve data and other desired operations. The system controller 122 may include or access memory, secondary storage devices, processors, and any other components for running an application. The memory and secondary storage devices may be in the form of read-only memory (ROM) or random access memory (RAM) or integrated circuitry that is accessible by the controller. Various other circuits may be associated with the system controller 122 such as power supply circuitry, signal conditioning circuitry, driver circuitry, and other types of circuitry.

The system controller 122 may be a single controller or may include more than one controller (such as additional controllers associated with each of the digging machines 102, loading machines 104, hauling machines 106, and/or other machines of the system 100) configured to control various functions and/or features of the system 100. As used herein, the term "controller" is meant in its broadest sense to include one or more controllers, processors, central processing units, and/or microprocessors that may be associated with the system 100, and that may cooperate in controlling various functions and operations of the machines included in the system 100. The functionality of the system controller 122 may be implemented in hardware and/or software without regard to the functionality. The system controller 122 may rely on one or more data maps, look-up tables, neural networks, algorithms, machine learning algorithms, and/or other components relating to the operating conditions and the operating environment of the system 100 that may be stored in the memory of the system controller 122. Each of the data maps noted above may include a collection of data in the form of tables, graphs, and/or equations to maximize the performance and efficiency of the system 100 and its operation.

The components of the control system 120 may be in communication with and/or otherwise operably connected to any of the components of the system 100 via a network 124. The network 124 may be a local area network ("LAN"), a larger network such as a wide area network ("WAN"), or a collection of networks, such as the Internet. Protocols for network communication, such as TCP/IP, may be used to implement the network 124. Although embodiments are described herein as using a network 124 such as the Internet, other distribution techniques may be implemented that transmit information via memory cards, flash memory, or other portable memory devices.

It is also understood that the digging machines 102, loading machines 104, hauling machines 106, and/or other machines of the system 100 may include respective controllers, and each of the respective controllers described herein (including the system controller 122) may be in communication and/or may otherwise be operably connected via the network 124. For example, the network 124 may comprise a component of a wireless communication system of the system 100, and as part of such a wireless communication system, the digging machines 102, loading machines 104, hauling machines 106, and/or other machines of the system 100 may include respective communication devices 126. Such communication devices 126 may be configured to permit wireless transmission of a plurality of signals, instructions, and/or information between the system controller 122 and the respective controllers of the digging machines 102, loading machines 104, hauling machines 106, and/or other machines of the system 100. Such communication devices 126 may also be configured to permit communication with other machines and systems remote from the worksite 112. For example, such communication devices 126 may include a transmitter configured to transmit signals (e.g., via the central station 108 and over the network 124) to a receiver of one or more other such communication devices 126. In such examples, each communication device 126 may also include a receiver configured to receive such signals (e.g., via the central station 108 and over the network 124). In some examples, the transmitter and the receiver of a particular communication device 126 may be combined as a transceiver or other such component. In any of the examples described herein, such communication devices 126 may also enable communication (e.g., via the central station 108 and over the network 124) with one or more tablets, computers, cellular/wireless telephones, personal digital assistants, mobile devices, or other electronic devices 128 located at the worksite 112 and/or remote from the worksite 112. Such electronic devices 128 may comprise, for example, mobile phones and/or tablets of project managers (e.g., foremen) overseeing daily operations at the worksite 112.

The network 124, communication devices 126, and/or other components of the wireless communication system described above may implement or utilize any desired system or protocol including any of a plurality of communications standards. The desired protocols will permit communication between the system controller 122, one or more of the communication devices 126, and/or any other desired machines or components of the system 100. Examples of wireless communications systems or protocols that may be used by the system 100 described herein include a wireless personal area network such as Bluetooth™. (e.g., IEEE 802.15), a local area network such as IEEE 802.11b or 802.11g, a cellular network, or any other system or protocol for data transfer. Other wireless communication systems and configurations are contemplated. In some instances, wireless communications may be transmitted and received directly between the control system 120 and a machine (e.g., a paving machine 106, a loading machine 104, etc.) of the system 100 or between such machines. In other instances, the communications may be automatically routed without the need for re-transmission by remote personnel.

In example embodiments, one or more machines of the system 100 (e.g., the one or more digging machines 102, loading machines 104, hauling machines 106, etc.) may include a location sensor 130 configured to determine a location, speed, heading, and/or orientation of the respective machine. In such embodiments, the communication device 126 of the respective machine may be configured to generate and/or transmit signals indicative of such determined locations, speeds, headings, and/or orientations to, for example, the system controller 122 and/or to the other respective machines of the system 100. In some examples, the location sensors 130 of the respective machines may include and/or comprise a component of global navigation satellite system (GNSS) or a global positioning system (GPS). Alternatively, universal total stations (UTS) may be utilized to locate respective positions of the machines. In example embodiments, one or more of the location sensors 130 described herein may comprise a GPS receiver, transmitter, transceiver, laser prisms, and/or other such device, and the location sensor 130 may be in communication with one or more GPS satellites 132 and/or UTS to determine a respective location of the machine to which the location sensor 130 is connected continuously, substantially continuously, or at various time intervals. One or more additional machines of the system 100 may also be in communication with the one or more GPS satellites 132 and/or UTS, and such GPS satellites 132 and/or UTS may also be configured to determine respective locations of such additional machines. In any of the examples described herein, machine locations, speeds, headings, orientations, and/or other parameters determined by the respective location sensors 130 may be used by the system controller 122 and/or other components of the system 100 to coordinate activities of the digging machines 102, loading machines 104, hauling machines 106, and/or other components of the system 100.

For example, a first location determined by a location sensor 130 carried by a loading machine 104, and a second location determined by a location sensor 130 carried by a hauling machine 106, may be used by the system controller 122 and/or by a controller 136 of the loading machine 104 to determine a travel path 114*b* extending from a current location of the loading machine 104 to a current location of the hauling machine 106. In such examples, the controller 136 of the loading machine 104 may control the loading machine 104 to traverse at least part of the travel path 114*b* in order to accomplish one or more tasks at the worksite 112. Such determined travel paths 114 may be useful in maximizing the efficiency of loading machine operations, and in maximizing the efficiency of the system 100, generally.

In any of the examples described herein, the system controller 122 and/or the respective controllers 136 of the various machines of the system 100 may be configured to generate a user interface (not shown) that includes, among other things, information indicative of the travel paths 114, travel speeds, orientations, and/or other travel parameters of the respective machines. In some examples, and in addition to the various travel parameters described above, the system controller 122 and/or the controller 136 of the loading machine 104 may also determine one or more work tool positions associated with a work tool 140 of the loading machine 104. In such examples, the user interface may also include information indicative of the determined work tool positions. As will be described in greater detail below, each of the work tool positions may correspond to a respective location along at least one of the travel paths 114. In any of the examples described herein, such user interfaces may be generated and provided by the controller 136 to, for example, the electronic device 128 (e.g., via the network 124), a display of the loading machine 104, the system controller 122 (e.g., via the network 124), and/or to one or more components of the system 100 for display. Additionally or alternatively, such user interfaces may be generated and provided by the system controller 122 to, for example, the electronic device 128 (e.g., via the network 124), a display of the loading machine 104, the controller 136 (e.g., via the network 124), and/or to one or more components of the system 100 for display. In any of the examples described herein, one or more of the digging machines 102, loading machines 104, hauling machines 106, and/or other machines of the system 100 may be manually controlled, semi-autonomously controlled, and/or fully-autonomously controlled. In examples in which the digging machines 102, loading machines 104, hauling machines 106, and/or other machines of the system 100 are operating under autonomous or semi-autonomous control, the speed, steering, work tool positioning/movement, and/or other functions of such machines may be controlled automatically or semi-automatically based at least in part on the determined travel parameters and/or work tool positions described herein.

With continued reference to FIG. 1, and as noted above, each of the digging machines 102, loading machines 104, hauling machines 106, and/or other machines of the system 100 may include a controller 136, and such a controller 136 may comprise a component of a local control system on-board and/or otherwise carried by the respective machine. Such controllers 136 may be generally similar or identical to the system controller 122 of the control system 120. For example, each such controller 136 may comprise one or more processors, a memory, and/or other components described herein with respect to the system controller 122. In some examples, a controller 136 may be located on a respective one of the loading machines 104, and may also include components located remotely from the respective one of the loading machines 104, such as on any of the other machines of the system 100 or at the command center described above (not shown). Thus, in some examples the functionality of the controller 136 may be distributed so that certain functions are performed on the respective one of the loading machines 104 and other functions are performed remotely. In some examples, controller 136 of the local control system carried by a respective machine may enable autonomous and/or semi-autonomous control of the respective machine either alone or in combination with the control system 120.

Further, in addition to the communication devices 126 and location sensors 130 described above, one or more of the digging machines 102, loading machines 104, hauling machines 106, and/or other machines of the system 100 may include a perception sensor 134 configured to determine one or more characteristics of the work surface 110. For instance, the controller 136 of a particular machine may be electrically connected to and/or otherwise in communication with the communication device 126, the location sensor 130, and the perception sensor 134 carried by the particular machine, and the perception sensor 134 may be configured to sense, detect, observe, and/or otherwise determine various characteristic of the work surface 110 (e.g., characteristics of an imperfection 118 formed by and/or disposed on the work surface 110) as the respective machine travels along one or more travel paths 114 or other portions of the work surface 110. In some examples, one or more of the communication device 126, the location sensor 130, and the perception sensor 134 may be fixed to the cab, chassis, frame, and/or any other component of the respective machine. In other examples, however, one or more of the communication device 126, the location sensor 130, and the perception sensor 134 may be removably attached to a respective machine and/or disposed within, for example, the cab of such a machine during operation.

In some examples, the perception sensor 134 may comprise a single sensor and/or other component of a local perception system disposed on the machine (e.g., disposed on a loading machine 104). In other examples, the perception sensor 134 may comprise a plurality of like or different sensors, each of which comprises a component of such a local perception system disposed on the machine. For example, the perception sensor 134 may comprise, among other things, an image capture device. Such an image capture device may be any type of device configured to capture images representative of the work surface 110, the work site 112, and/or other environments within a field of view of the image capture device. For instance, an example image capture device may comprise one or more cameras (e.g., RGB-cameras, monochrome cameras, intensity (grey scale) cameras, infrared cameras, ultraviolet cameras, depth cameras, stereo cameras, etc.). Such an image capture device may be configured to capture image data representing, for example, a length, width, height, depth, volume, color, texture, composition, radiation emission, and/or other characteristics of one or more objects (e.g., an imperfection 118) within the field of view of the image capture device. For instance, such characteristics may also include one or more of an x-position (global position coordinate), a y-position (global position coordinate), a z-position (global position coordinate), an orientation (e.g., a roll, pitch, yaw), an object type (e.g., a classification), a velocity of the object, an acceleration of the object, etc. It is understood that one or more such characteristics (e.g., a location, a dimension, a volume, etc.) may be determined by the image capture device alone or in combination with the location sensor 130 described above. Characteristics associated with the work surface 110 and/or associated with the worksite 112 may also include, but are not limited to, a presence of another machine, person, or other object in the field of view of the perception sensor 134, a time of day, a day of a week, a season, a weather condition, an indication of darkness/light, etc.

The image capture device and/or other components of the perception sensor 134 may also be configured to provide one or more signals to the controller 136 including such image data or other sensor information captured thereby. Such sensor information may include, for example, a plurality of images captured by the image capture device and indicative of various characteristics of one or more objects (e.g., the imperfection 118) within the field of view of the image capture device. Each such image may include a respective group of imperfections 118 and/or other objects detectable by the image capture device. In such examples, the controller 136 and/or the system controller 122 may analyze the sensor information received from the perception sensor 134 to identify the one or more imperfections 118 indicated by the sensor information (e.g., shown or otherwise included in such images).

The perception sensor 134 and/or the local perception system carried by the machine may also include a light detection and ranging (hereinafter, "LIDAR") sensor. Such a LIDAR sensor may include one or more lasers or other light emitters carried by (e.g., mounted on, connected to, etc.) the particular vehicle, as well as one or more light sensors configured to receive radiation radiated, reflected, and/or otherwise returned by an object onto which light from such light emitters has been impinged. In example embodiments, such a LIDAR sensor may be configured such that the one or more lasers or other light emitters are mounted to spin (e.g., about a substantially vertical axis), thereby causing the light emitters to sweep through, for example, a 360 degree range of motion, to capture LIDAR sensor data associated with an imperfection 118, the work surface 110, and/or the worksite 112, generally. For example, a LIDAR sensor of the present disclosure may have a light emitter and a light sensor, with the light emitter including one or more lasers that direct highly focused light toward an object or surface, which reflects the light back to the light sensor, though any other light emission and detection to determine range is contemplated (e.g., flash LIDAR, MEMS LIDAR, solid state LIDAR, and the like). Measurements of such a LIDAR sensor may be represented as three-dimensional LIDAR sensor data having coordinates (e.g., Cartesian, polar, etc.) corresponding to positions or distances captured by the LIDAR sensor. For example, three-dimensional LIDAR sensor data and/or other sensor information received from the LIDAR sensor may include a three-dimensional map or point cloud, which may be represented as a plurality of vectors emanating from a light emitter and terminating at an object (e.g., an imperfection 118) or surface (e.g., the work surface 110). In some examples, converting operations may be used by the controller 136 and/or by the system controller 122 to convert the three-dimensional LIDAR sensor data to multi-channel two-dimensional data. In some examples, the LIDAR sensor data and/or other sensor information received from the perception sensor 134 may be automatically segmented by the controller 136 and/or by the system controller 122, and the segmented LIDAR sensor data may be used, for example, as input for determining trajectories, travel paths 114, travel speeds, and/or other travel parameters of the machines described herein (e.g., travel parameters of one or more of the loading machines 104).

The perception sensor 134 and/or the local perception system carried by the machine may also include one or more additional sensors. Such additional sensors may include, for example, a radio detection and ranging (hereinafter, "RADAR") sensor, a sound navigation and ranging (hereinafter, "SONAR") sensor, a depth sensing camera, a ground-penetrating RADAR sensor, a magnetic field emitter/detector, and/or other sensors disposed on the vehicle and configured to detect objects present in the worksite 112. Each of the sensors described herein with respect to the perception sensor 134 and/or the local perception system may output one or more respective signals to the controller 136 and/or to the system controller 122, and such signals may include any of the sensor information described above (e.g., image data, LIDAR data, RADAR data, SONAR data, GPS data, etc.). Such sensor information may be captured simultaneously by the various sensors of the perception sensor 134, and in some instances, the sensor information received from the respective sensors of the perception sensor 134 may include, identify, and/or be indicative of one or more of the same objects (e.g., an imperfection 118) sensed by such sensors. In such examples, the controller 136 and/or to the system controller 122 may analyze the sensor information received from each of the respective sensors to identify and/or classify the one or more objects indicated by the sensor information.

For example, the controller 136 and/or to the system controller 122 may correlate the output of each sensor modality to a particular object stored in a memory thereof and/or to a particular location of the worksite 112. Using such data association, object recognition, and/or object characterization techniques, the output of each of the sensors described herein can be compared. Through such comparisons, and based at least partly on the sensor information received from the perception sensor 134 and/or the location sensor 130, the controller 136 and/or to the system controller 122 may identify one or more objects located at the worksite 112 (e.g., an imperfection 118 of the work surface 110 located along one or more of the travel paths 114 described herein). As noted above, corresponding sensor information received from both the perception sensor 134 and the location sensor 130 may be combined and/or considered together by the controller 136 and/or the system controller 122 in order to determine the location, shape, dimensions, volume, and/or other characteristics of the various imperfections 118 described herein.

Further, in some examples, and depending on the accuracy and/or fidelity of the sensor information received from the various sensors associated with the perception sensor 134, the presence, location, orientation, identity, length, width, height, depth, and/or other characteristics of an object (e.g., an imperfection 118) identified by the controller 136 using first sensor information (e.g., LIDAR data) may be verified by the controller 136 using second sensor information (e.g., image data) obtained simultaneously with the first sensor information but from a different sensor or modality of the perception sensor 134.

With continued reference to FIG. 1, in some examples one or more machines (e.g., a loading machine 104) of the system 100 may include an implement or other work tool 140 that is coupled to a frame of the machine. For example, in the case of a loading machine 104, the work tool may comprise a bucket configured to carry material within an open volume or other substantially open space thereof. The loading machine 104 may be configured to, for example, scoop, lift, and/or otherwise load material (e.g., material removed by the digging machines 102) into the work tool 140 by lowering the work tool 140 to a loading position. For example, the loading machine 104 may include one or more linkages 142 movably connected to a frame of the loading machine. The work tool 140 may be connected to such linkages 142, and the linkages 142 may be used to lower the work tool 140 (e.g., via one or more hydraulic cylinders, electronic motors, or other devices connected thereto) to a loading position in which a leading edge 144 of the work tool 140 is disposed proximate, adjacent, and/or at the work surface 110, and a base of the work tool 140 is disposed substantially parallel to the work surface 110. The loading machine 104 may then be controlled to advance along the travel path 114a such that the work tool 140 may impact the pile 116 of material, a positive-volume imperfection 118, and/or other object disposed on the work surface 110 so as to transfer the material at least partially into the open space of the work tool 140. The linkages 142 may then be controlled to raise, pivot, and/or tilt the work tool 140 to a carrying position above the work surface 110 and substantially out of the view of, for example, an operator controlling movement of the loading machine 104. The loading machine 104 may then be controlled to traverse, for example the travel path 114b until the loading machine 104 reaches a dump zone, the hauling machine 106, and/or another location at the work site 112 designated for receiving the removed material being carried by the work tool 140. The linkages 142 may then be controlled to lower, pivot, and/or tilt the work tool 140 to an unloading position in which the material carried within the open space of the work tool 140 may be deposited (e.g., due to the force of gravity acting on the material carried by the work tool 140) at the dump zone, within a bed of the hauling machine 106, and/or as otherwise desired.

Figure 2:
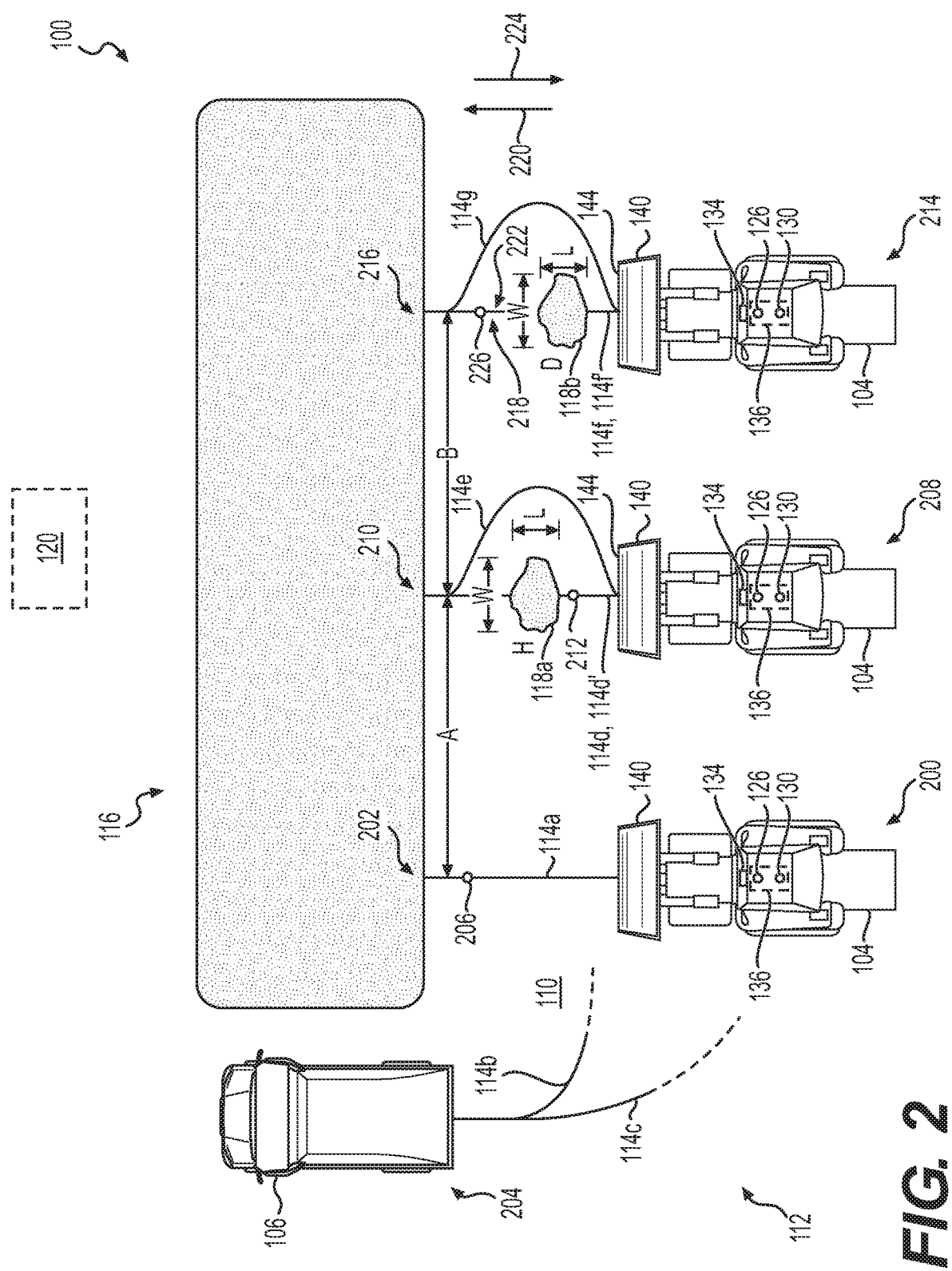
FIG. 2 is another schematic illustration of the system shown in FIG. 1.

FIG. 2 illustrates aspects of the example system 100 and worksite 112 described above with respect to FIG. 1 in further detail. As noted above, and as shown in FIG. 2, a loading machine 104 may be configured to travel along, and/or otherwise traverse at least part of one or more travel paths 114 formed by the work surface 110 in order to perform various tasks at the worksite 112. For example, a loading machine 104 may be controlled to traverse the travel path 114a, from a current location 200 (e.g., a first location) of the loading machine 104 to a location 202 (e.g., a second location) of the pile 116 of material disposed at the worksite 112. In order to perform a task that involves moving and/or otherwise relocating at least a portion of the pile 116 of material, the controller 136 of the loading machine 104 may cause the one or more linkages 142 (FIG. 1) to lower the work tool 140 to the loading position described above and/or to other similar work tool positions. The controller 136 may then control the loading machine 104 to advance along the travel path 114a such that the work tool 140 may impact the pile 116 of material while in the loading position. For example, the controller 136 may cause the one or more linkages 142 to lower the work tool 140 to the loading position, at a location 206 along the travel path 114a, prior to impacting the pile 116 of material. The controller 136 may then cause the one or more linkages 142 to raise the work tool 140, relative to the work surface 110, to the carrying position described above such that material disposed within the open space of the work tool 140 may be retained therein as the loading machine 104 is controlled to traverse one or more additional travel paths 114. The controller 136 may then, for example, control the loading machine 104 to traverse at least part of the travel path 114b extending from the location 202 to a location 204 (e.g., a third location) of the hauling machine 106 and/or of a designated dump zone at the worksite 112. The controller 136 may control the loading machine 104 to deposit the material disposed within the open space of the work tool 140 at the location 204 before traversing at least part of an additional travel path 114c (e.g., a third travel path) extending from the location 204 to a different location of the worksite 112.

In some examples, the travel path 114c may extend from the location 204 to an additional location 208 (e.g., a fourth location) of the worksite 112. As shown in FIG. 2, in some examples, the location 208 may be proximate and/or adjacent to the location 200 described above. Once the loading machine 104 reaches the location 208, the controller 136 may control the heading and/or orientation of the loading machine 104 such that the work tool 140 is positioned opposite and facing the pile 116 of material. The controller 136 may then control the loading machine 104 to traverse at least part of an additional travel path 114d generated and/or otherwise determined by the controller 136. In such examples, the travel path 114d may be substantially similar to the travel path 114a described above in that the travel path 114d may extend, in a substantially linear or direct fashion, from a current location of the loading machine 104 (e.g., the location 208) to a location 210 (e.g., a fifth location) of the pile 116 of material. In some examples, the location 210 may be disposed at, proximate, and/or adjacent to the location 202. Alternatively, in other embodiments, the location 210 may be spaced from the location 202 by a desired distance A. The distance A may have any value (e.g., one foot, two feet, three feet, six feet, nine feet, etc.) useful in loading material from the pile 116 into the open space of the work tool 140.

In some examples, the perception sensor 134 carried by the loading machine 104 may sense at least part of one or more of the travel paths 114 described herein, and may direct corresponding signals to the controller 136 including sensor information associated with portions of the work surface 110 defining the respective travel paths 114. In any of the examples described herein, the location sensor 130 may also sense, detect, and/or otherwise determine the location of the loading machine 104 simultaneously with the sensing operations performed by the perception sensor 134, and may direct corresponding signals to the controller 136 including sensor information indicating the location of the loading machine 104. In some examples, the sensor information provided by the location sensor 130 and/or the perception sensor 134 may be timestamped and/or otherwise marked with metadata such that a correspondence between the sensor information can be identified by the controller 136.

In some examples, the perception sensor 134 may sense at least part of the travel path 114d before the loading machine 104 traverses the travel path 114d and/or while the loading machine 104 is controlled to traverse the travel path 114d. As shown in FIG. 2, in some examples, an imperfection 118a of the work surface 110 may be located along (e.g., on, proximate to, adjacent to, etc.) the travel path 114d. In such examples, the perception sensor 134 may sense, detect, observe, capture, and/or otherwise determine one or more characteristics of the imperfection 118a, and may provide one or more corresponding signals to the controller 136. Such signals may contain sensor information associated with the work surface 110 defining the travel path 114d and indicative of the determined characteristics. As noted above, such characteristics may include, for example, a length, width, height, depth (e.g., a dimension), volume, color, texture, composition, radiation emission, position/location, an orientation, object type (e.g., a classification), velocity, acceleration, and/or other characteristics. The location sensor 130 may also determine and provide corresponding sensor information indicating the location of the loading machine 104. In such examples, the controller 136 may receive the sensor information included in the one or more signals provided by the perception sensor 134 and/or the location sensor 130, and may identify the imperfection 118a of the work surface 110 located along the travel path 114d based at least partly on the received sensor information. In some examples, the controller 136 may also determine one or more travel parameters of the loading machine 104, and/or one or more work tool positions associated with the work tool 140, based at least partly on identifying the imperfection 114d. Such travel parameters may include, for example, an additional travel path 114d', 114e of the loading machine 104 extending along, and/or otherwise defined by the work surface 110, machine speeds corresponding to the one or more additional travel paths 114d', 114e, headings and/or orientations of the loading machine 104 corresponding to the one or more additional travel paths 114d', 114e, etc. Additionally, each position of the work tool positions determined by the controller 136 may correspond to a respective location along the one or more additional travel paths 114d', 114e.

In some examples, the controller 136 may determine, based at least partly on the characteristics of the imperfection 118a, that the imperfection 118a, has a positive volume (e.g., that the imperfection 118a is one of a mound, build-up, spillage, pile, etc. of material disposed on and/or formed by the work surface 110). Based at least partly on determining that the imperfection 118a, has a positive volume, the controller 136 may also determine whether one or more characteristics of the imperfection 118a satisfies a threshold associated with positive-volume imperfections. Such a threshold may comprise, for example, a length threshold associated with a length L of the imperfection 118a, a width threshold associated with a width W of the imperfection 118a, a height threshold associated with a height H of the imperfection 118a, a volume threshold associated with a volume of the imperfection 118a, and/or any other such threshold or combination thereof. In such examples, determining that the one or more characteristics of the imperfection 118a satisfy the associated threshold may include determining that the one or more characteristics of the imperfection 118a have values that are less than or equal to the associated threshold. For example, in some embodiments the threshold may comprise a volume threshold that corresponds to a volume of the open space of the work tool 140 (e.g., a struck volume). Such a volume threshold may comprise, for example, a value equal to ¾ of the struck volume of the work tool 140. In such examples, if the volume of the imperfection 118a (as determined by the controller 136, and/or by the perception sensor 134) has a value that is less than or equal to ¾ of the struck volume of the work tool 140, the controller 136 may determine that such a characteristic of the imperfection 118a satisfies the volume threshold. It is understood that in other examples, any other value or threshold may be used by the controller 136 to make such determinations.

By determining that such a volume threshold has been satisfied, the controller 136 may determine that the work tool 140 has the capacity to, load, collect, and/or otherwise cleanup the positive-volume imperfection 118a while traveling along the travel path 114d described above. In such examples, the controller 136 may determine and/or control the loading machine 104 to traverse a travel path 114d' that is substantially similar to, substantially the same as, and/or that otherwise extends substantially entirely along the travel path 114d. In such examples, the controller 136 may cause the one or more linkages 142 (FIG. 1) to lower the work tool 140 to the loading position described above. The controller 136 may then control the loading machine 104 to advance along the travel path 114d' such that the work tool 140 may impact the imperfection 118a while in the loading position. For example, the controller 136 may cause the one or more linkages 142 to lower the work tool 140 to the loading position, at a location 212 along the travel path 114d', prior to impacting the imperfection 118a. The controller 136 may then cause the one or more linkages 142 to raise the work tool 140, relative to the work surface 110, to the carrying position described above such that material disposed within the open space of the work tool 140 (e.g., at least part of the cleared imperfection 118a) may be retained therein as the loading machine 104 is controlled to traverse a remainder of the travel path 114d' and/or one or more additional travel paths 114.

In some examples, the controller 136 may determine the composition and/or identity of the imperfection 118a based at least partly on sensor information received from the imaging device, the magnetic sensor, and/or other sensors of the perception sensor 134. For instance, the one or more cameras and/or other imaging devices of the perception sensor 134 may provide one or more images (e.g., digital images, thermal images, etc.) to the controller 136, and the controller 136 may use image recognition software, thermal image processing software, magnetic imaging software, and/or other components to identify composition of the imperfection 118*a* based on one or more such images. In such examples, the controller 136 may also compare the composition of the imperfection 118*a* with the composition of the pile 116 of material. In examples in which the composition of the imperfection 118*a* matches (e.g., is the same as and/or is substantially the same as) the composition of the pile 116 of material, the controller 136 may control the loading machine 104 to traverse the travel path 114*d'*, and to impact the pile 116 at the location 210 after impacting the imperfection 118*a*. Alternatively, in examples in which the composition of the imperfection 118*a* does not match (e.g., is different from) the composition of the pile 116 of material, the controller 136 may control the loading machine 104 to travel to a scrap zone or other location of the worksite 112, without impacting the pile 116, after impacting the imperfection 118*a*. As a result, example methods of the present disclosure may avoid mixing the different (e.g., non-matching) material of the imperfection 118*a* with the material of the pile 116.

On the other hand, determining that the one or more characteristics of the imperfection 118*a* do not satisfy a threshold associated with positive-volume imperfections may include determining that the one or more characteristics of the imperfection 118*a* have values that are greater than the associated threshold. For instance, in the example above in which the threshold comprises a volume threshold (e.g., ¾ of the struck volume of the work tool 140), if the volume of the imperfection 118*a* (as determined by the controller 136, and/or by the perception sensor 134) has a value that is greater than, for example, ¾ of the struck volume of the work tool 140, the controller 136 may determine that such a characteristic of the imperfection 118*a* fails to satisfy the volume threshold. By determining that such a volume threshold has not been satisfied, the controller 136 may determine that the work tool 140 does not have the capacity to, load, collect, and/or otherwise cleanup the positive-volume imperfection 118*a* while traveling along the travel path 114*d*.

In such examples, the controller 136 may determine and/or control the loading machine 104 to traverse a travel path 114*e* extending from a current location 208 of the loading machine 104 to the location 210 of the pile 116 of material disposed at the worksite 112. An example travel path 114*e* may be configured such that the loading machine 104 avoids impact with the imperfection 118*a* as the loading machine 104 traverses the travel path 114*e* from the current location 208 to the location 210 of the pile 116. Additionally, in any such examples, it is understood that the controller 136 may also generate and/or provide an alert, based at least partly on determining that the one or more characteristics of the imperfection 118*a* failed to satisfy a corresponding threshold. Such alerts may be, for example, provided to an operator of the loading machine 104, via a display of the loading machine 104 disposed within the cab. Additionally or alternatively, the controller 136 may provide one or more such alerts to the system controller 122, an electronic device 128 utilized by a foreman at the worksite 112, one or more additional machines of the system 100 disposed at the worksite 112, and/or to any other components of the control system 120, via the network 124. Such alerts may signal and/or may cause one or more additional machines of the system 100 (e.g., a machine having a work tool with a capacity greater than the capacity of the work tool 140) to cleanup, clear, and/or otherwise act on the imperfection 118*a*.

In further examples, by determining that the volume threshold described above has not been satisfied (e.g., by determining that the work tool 140 does not have the capacity to, load, collect, and/or otherwise cleanup the positive-volume imperfection 118*a*, in a single pass, while traveling along the travel path 114*d*), the controller 136 may control the hauling machine 104 to cleanup, clear, and/or otherwise act on the imperfection 118*a* in two or more passes. For example, upon making such a determination, the controller 136 may control the loading machine 104 to traverse a travel path (e.g., the travel path 114*d'* shown in FIG. 2) extending substantially centrally through the imperfection 118*a*. The controller 136 may control the loading machine 104 to impact the imperfection 118*a* with the work tool 140 positioned in the loading position described above, and the work tool 140 may collect as much of the imperfection 118*a* as possible in such a first pass. The controller 136 may then control the loading machine 104 to traverse the travel path 114*b*, to deposit the removed portion of the imperfection 118*a* at the location 204, and to return to the location 208. The perception sensor 134 may obtain additional sensor information associated with the imperfection 118*a* when the loading machine 104 is positioned at or near the location 208, and the controller 136 may determine one or more additional travel paths (e.g., additional passes) needed to cleanup, clear, and/or otherwise act on what remains of the imperfection 118*a* based at least partly on such additional sensor information and/or an existing worksite plan.

Moreover, while an initial travel path (e.g., the travel path 114*d'* shown in FIG. 2) extending substantially centrally through the imperfection 118*a* is described in the example above, in further examples, upon determining that two or more passes may be needed to cleanup, clear, and/or otherwise act on the imperfection 118*a*, the controller 136 may determine one or more alternate travel paths, cleanup strategies, and/or loading machine control strategies. Such an alternate cleanup and/or loading machine control strategy may include determining a first travel path extending substantially centrally through a first half (e.g., a left half) of the imperfection 118*a*, and a second travel path extending substantially centrally through a second half (e.g., a right half) of the imperfection 118*a*. A further alternate cleanup and/or loading machine control strategy may include determining a first travel path extending substantially centrally through a first third (e.g., a left third) of the imperfection 118*a*, a second travel path extending substantially centrally through a second third (e.g., a right third) of the imperfection 118*a*, and a third travel path extending substantially centrally through what remains of the imperfection 118*a* (e.g., a center third). Other cleanup and/or loading machine control strategies are also contemplated.

With continued reference to FIG. 2, in some examples the controller 136 may control the loading machine 104 to traverse at least part of still another travel path 114*f* generated and/or otherwise determined by the controller 136. In such examples, the travel path 114*f* may be substantially similar to the travel paths 114*a*, 114*d* described above in that the travel path 114*f* may extend, in a substantially linear or direct fashion, from a current location of the loading machine 104 (e.g., a sixth location 214) to a location 216 (e.g., a seventh location) of the pile 116 of material. In some examples, the location 216 may be disposed at, proximate, and/or adjacent to the location 210 of the pile 116. Alternatively, in other embodiments, the location 216 may be spaced from the location 210 by a desired distance B. Similar to the distance A, the distance B may have any value (e.g., one foot, two feet, three feet, six feet, nine feet, etc.) useful in loading material from the pile 116 into the open space of the work tool 140.

In such examples, the perception sensor 134 carried by the loading machine 104 may sense at least part of the travel path 114*f* before the loading machine 104 traverses the travel path 114*f* and/or while the loading machine 104 is controlled to traverse the travel path 114*f*. As shown in FIG. 2, in some examples an imperfection 118*b* of the work surface 110 may be located along (e.g., on, proximate to, adjacent to, etc.) the travel path 114*f*. In such examples, the perception sensor 134 may sense, detect, observe, capture, and/or otherwise determine one or more characteristics of the imperfection 118*b*, and may provide one or more corresponding signals to the controller 136. Such signals may contain sensor information associated with the work surface 110 defining the travel path 114*f* and indicative of the determined characteristics, and the determined characteristics may comprise any of the characteristics noted above (e.g., a length L, width W, depth D and/or other dimension of the imperfection 118*b*, a volume of the imperfection 118*b*, a location of the imperfection, etc.). In such examples, the controller 136 may receive the sensor information included in the one or more signals provided by the perception sensor 134, and may identify the imperfection 118*b* of the work surface 110 located along the travel path 114*f* based at least partly on the received sensor information. In some examples, the controller 136 may also determine one or more travel parameters of the loading machine 104, and/or one or more work tool positions associated with the work tool 140, based at least partly on identifying the imperfection 114*f*. Such travel parameters may include, for example, an additional travel path 114*f*, 114*g* of the loading machine 104 extending along, and/or otherwise defined by the work surface 110, machine speeds corresponding to the one or more additional travel paths 114*f*, 114*g*, headings and/or orientations of the loading machine 104 corresponding to the one or more additional travel paths 114*f*, 114*g*, etc. Additionally, each position of the work tool positions determined by the controller 136 may correspond to a respective location along the one or more additional travel paths 114*f*, 114*g*.

For example, the controller 136 may determine, based at least partly on the characteristics of the imperfection 118*b*, that the imperfection 118*b*, has a negative volume (e.g., that the imperfection 118*b* is one of a pothole, rut, ditch, etc. formed by the work surface 110). Based at least partly on determining that the imperfection 118*b*, has a negative volume, the controller 136 may also determine whether one or more characteristics of the imperfection 118*b* satisfies a threshold associated with negative-volume imperfections. Such a threshold may comprise, for example, a length threshold associated with the length L of the imperfection 118*b*, a width threshold associated with the width W of the imperfection 118*b*, a depth threshold associated with the depth D of the imperfection 118*b*, a volume threshold associated with a volume of the imperfection 118*b*, and/or any other such threshold or combination thereof. In such examples, determining that the one or more characteristics of the imperfection 118*b* satisfy the associated threshold may include determining that the one or more characteristics of the imperfection 118*b* have values that are less than or equal to the associated threshold. For example, in some embodiments the threshold may comprise a width threshold that corresponds to a width of the wheel base of the loading machine 104. Such a width threshold may comprise, for example, a value equal to ½ of the distance between inner surfaces of opposing tires on the loading machine 104. In such examples, if the width of the imperfection 118*b* (as determined by the controller 136, and/or by the perception sensor 134) has a value that is less than or equal to ½ of the distance between inner surfaces of opposing tires on the loading machine 104, the controller 136 may determine that such a characteristic of the imperfection 118*b* satisfies the width threshold. It is understood that in other examples, any other value or threshold (e.g., a value greater than or less than ½ of the distance between inner surfaces of opposing tires on the loading machine 104) may be used by the controller 136 to make such determinations.

By determining that such a width threshold has been satisfied, the controller 136 may determine that the loading machine 104 may safely cross over the imperfection 118*b* while traveling along the travel path 114*f* described above without causing damage to the loading machine 104 and/or injury to an operator of the loading machine 104. In such examples, the controller 136 may determine and/or control the loading machine 104 to traverse a travel path 114*f*. In such examples, at least part of the travel path 114*f* may be substantially similar to, substantially the same as, and/or that otherwise extends substantially entirely along the travel path 114*f*. For example, the travel path 114*f* may include a first part 218 and a second part 222. In such examples, one or both of the first part 218 and the second part 222 may be substantially similar to, substantially the same as, and/or may otherwise extend substantially entirely along the travel path 114*f*.

For instance, the controller 136 may control the loading machine 104 to traverse the first part 218 of the travel path 114*f*, while oriented as shown in FIG. 2 relative to the imperfection 118*b*, and in a direction 220. The controller 136 may also cause the one or more linkages 142 (FIG. 1) to lower the work tool 140 to the loading position described above, as the loading machine 104 approaches the pile 116 of material. The controller 136 may control the loading machine 104 to advance along the travel path 114*f* such that the work tool 140 may impact the pile 116 of material at the location 216 while the work tool 140 is in the loading position. The controller 136 may then cause the one or more linkages 142 to raise the work tool 140, relative to the work surface 110, to the carrying position described above such that material disposed within the open space of the work tool 140 (e.g., material removed from the pile 116) may be retained therein.

The controller 136 may then control the loading machine 104 to travel, in a direction 224 opposite the direction 220, along the second part 222 of the travel path 114*f* while maintaining the orientation shown in FIG. 2 relative to the imperfection 118*b*. While traveling in the direction 224 along the second part 222 of the travel path 114*f*, the controller 136 may control the work tool 140 to transfer material from the work tool 140 to the imperfection 118*b* as the loading machine 104 passes over the imperfection 118*b*. For example, the controller 136 may control the one or more linkages 142 to lower, pivot, shake, tilt, and/or otherwise move the work tool 140, relative to the work surface 110 and at a location 226 (e.g., proximate the imperfection 118*b*), such that the material carried within the open space of the work tool 140 may be deposited substantially within the negative-volume imperfection 118*b*. In some examples, controlling the linkages 142 in this way may dispose the work tool 140 in the unloading position described above. Controlling the linkages 142 in this way may also cause material retained within the work tool 140 to fall into the negative-volume imperfection 118b, assisted by the force of gravity, as the loading machine 104 passes over the imperfection 118b.

In some examples, the controller 136 may control the loading machine 104 to operate in a manner different from that described above in order to transfer material from the work tool 140 to the imperfection 118b. For example, in some embodiments, upon removing material from the pile 116 at the location 216, the controller 136 may control the loading machine 104 to travel in the direction 224, along the second part 222 of the travel path 114f and while maintaining the orientation shown in FIG. 2, without controlling the one or more linkages 142 to lower, pivot, shake, tilt, and/or otherwise move the work tool 140 at the location 226. Instead, the controller 136 may control the loading machine 104 to return to or proximate the location 214 while material is still retained within the work tool 140. The controller 136 may then cause the loading machine 104 to travel in the direction 220, along the travel path 114f and while maintaining the orientation shown in FIG. 2. The controller 136 may also control the one or more linkages 142 to lower, pivot, shake, tilt, and/or otherwise move the work tool 140, relative to the work surface 110, while traveling along the travel path 114f in the direction 220 and as the loading machine 104 passes over the imperfection 118b, so as to deposit the material carried by the work tool 140 into the negative-volume imperfection 118b.

In further embodiments, the controller 136 may cause the loading machine 104 to be oriented approximately 90 degrees counterclockwise relative to the orientation shown in FIG. 2, while material is still retained within the work tool 140. The controller 136 may then cause the loading machine 104 to travel in a direction toward the imperfection 118b (e.g., along a travel path that is substantially perpendicular to the travel path 114f). The controller 136 may also control the one or more linkages 142 to lower, pivot, shake, tilt, and/or otherwise move the work tool 140, relative to the work surface 110, while traveling along such a substantially perpendicular travel path and as the loading machine 104 passes over the imperfection 118b, so as to deposit the material carried by the work tool 140 into the negative-volume imperfection 118b. In further embodiments, additional methods of depositing removed material into the imperfection 118b with the loading machine 104 may be used.

On the other hand, determining that the one or more characteristics of the imperfection 118b do not satisfy a threshold associated with negative-volume imperfections may include determining that the one or more characteristics of the imperfection 118b have values that are greater than the associated threshold. For instance, in the example above in which the threshold comprises a width threshold (e.g., ½ of the distance between inner surfaces of opposing tires on the loading machine 104), if the width W of the imperfection 118b (as determined by the controller 136, and/or by the perception sensor 134) has a value that is greater than ½ of the distance between inner surfaces of opposing tires on the loading machine 104, the controller 136 may determine that such a characteristic of the imperfection 118a fails to satisfy the width threshold. By determining that such a width threshold has not been satisfied, the controller 136 may determine that the work tool 140 may not be capable of safely traversing the travel path 114f due to the depth, width, length, and/or other configuration of the imperfection 118b. In such examples, the controller 136 may determine and/or control the loading machine 104 to traverse a travel path 114g extending from a current location 214 of the loading machine 104 to the location 216 of the pile 116 of material disposed at the worksite 112. In such examples, and similar to the travel path 114e described above, the travel path 114g may be configured such that the loading machine 104 avoids the imperfection 118b as the loading machine 104 traverses the travel path 114g from the current location 214 to the location 216 of the pile 116. Additionally, in any such examples, it is understood that the controller 136 may also generate and/or provide an alert, based at least partly on determining that the one or more characteristics of the imperfection 118b failed to satisfy a corresponding threshold. Similar to the alerts described above, such alerts may be, for example, provided to an operator of the loading machine 104, via a display of the loading machine 104. Additionally or alternatively, the controller 136 may provide one or more such alerts to the system controller 122, an electronic device 128, one or more additional machines of the system 100, and/or to any other components of the control system 120, via the network 124.

Figure 3:
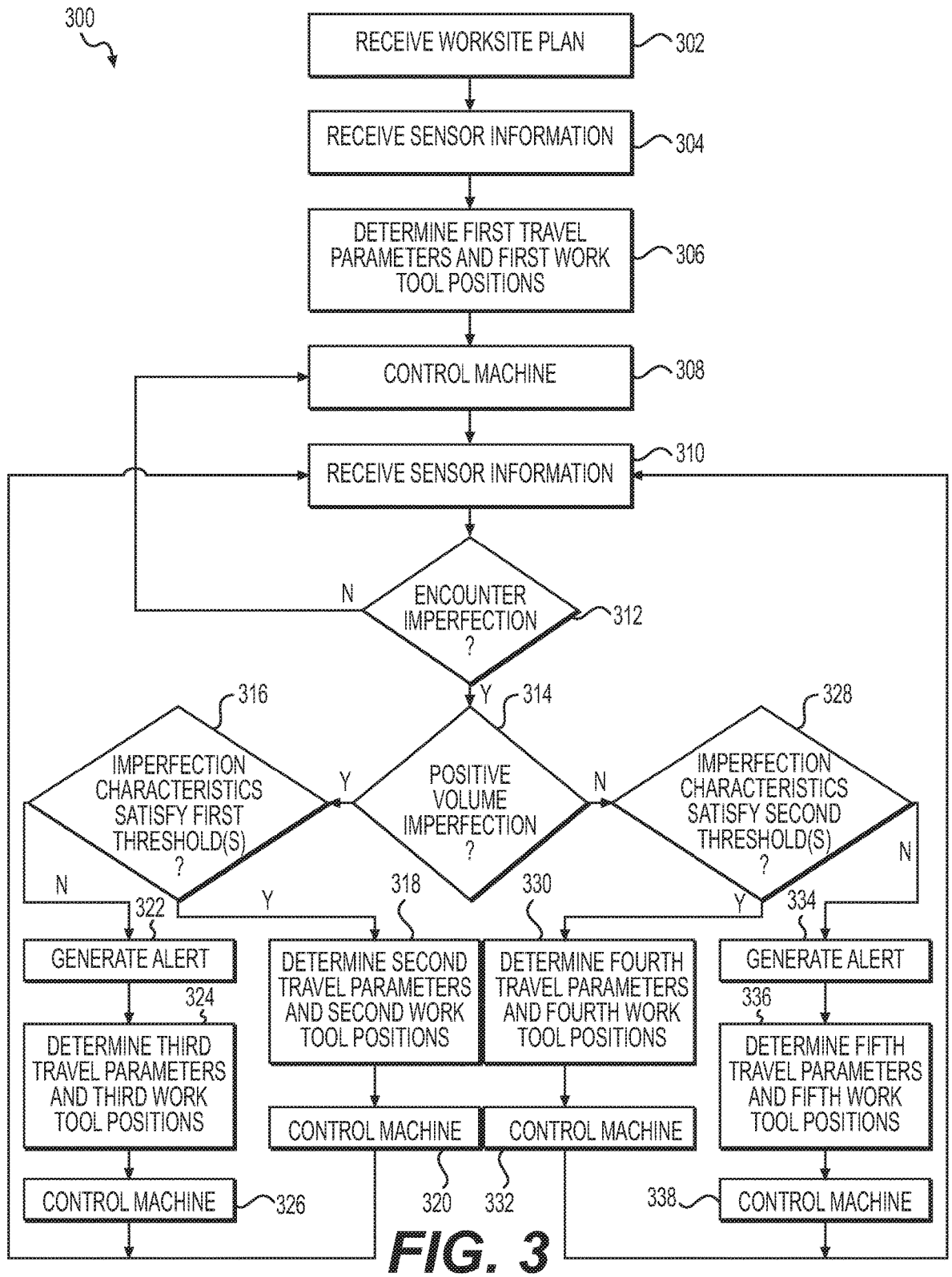
FIG. 3 is a flow chart depicting an example method associated with the system shown in FIGS. 1 and 2.

FIG. 3 illustrates a flow chart depicting an example method 300 associated with the system 100. The example method 300 is illustrated as a collection of steps in a logical flow diagram, which represents operations that can be implemented in hardware, software, or a combination thereof. In the context of software, the steps represent computer-executable instructions stored in memory. When such instructions are executed by, for example, the controller 136 of a loading machine 104, such instructions may cause the loading machine, various components of the control system 120 (e.g., the system controller 122), a controller of a hauling machine 106, a controller of a digging machine 102, and/or other components of the system 100 to perform the recited operations. Such computer-executable instructions may include routines, programs, objects, components, data structures, and the like that perform particular functions or implement particular abstract data types. The order in which the operations are described is not intended to be construed as a limitation, and any number of the described steps can be combined in any order and/or in parallel to implement the process. For discussion purposes, and unless otherwise specified, the method 300 is described with reference to the system 100, the control system 120, the controller 136 of a loading machine 104, the worksite 112, and/or other items shown in FIGS. 1 and 2. In particular, although any part of and/or the entire method 300 may be performed by the system controller 122, the electronic device 128, a controller of a hauling machine 106, a controller of a digging machine 102, and/or other components of the system 100, either alone or in combination, unless otherwise specified, the method 300 will be described below with respect to the controller 136 of a loading machine 104 for ease of description.

With reference to FIG. 3, at 302 the controller 136 may receive information associated with one or more tasks, jobs, or other operations to be performed by the system 100 at the worksite 112. The information received at 302 may include, for example, among other things, a worksite plan that is to be executed by one or more machines (e.g., the digging machine 102, the loading machine 104, the hauling machine 106, etc.) of the system 100 at the worksite 100. A worksite plan may include, for example, instructions, locations (e.g., GPS coordinates, UTS coordinates, etc.), and/or other information identifying a perimeter and/or boundary of at least a portion of the work surface 110 within which such operations are to be performed. For example, a worksite plan may include GPS coordinates identifying a boundary and/or other area of the work surface 110 within which material should be cleared and/or otherwise moved. In some examples, the worksite plan may include a first set of GPS coordinates, and/or other information identifying the pile 116 of material (e.g., identifying the location of the pile 116), and a second set of GPS coordinates identifying a dump zone, a hauling machine 106, and/or other area (e.g., identifying the location of one or more such machines or areas) within the worksite 112 where material removed by the loading machine 104 is to be deposited.

In some examples, the worksite plan received at 302 may also include information indicative of the type of material to be moved (e.g., soil, sand, minerals, gravel, concrete, asphalt, overburden, etc.), information uniquely identifying the machines present at the worksite 112 (e.g., one or more license plate numbers, model numbers, machine types, and/or other unique identifiers associated with the respective machines of the system 100 present at the worksite 112), information uniquely identifying the operators of the respective machines (e.g., names, employers, employee identification numbers, experience levels, and/or other information), a two-dimensional and/or three-dimensional map of the worksite 112, GPS coordinates of any known imperfections 118 or other obstacles at the worksite 112 (e.g., GPS coordinates identifying the location, boundary, and/or extent of one or more trees, bodies of water, man-made obstruction, power lines, utility lines, drainage lines, roads, sidewalks, parking lots, etc.), and/or other information associated with the system 100 and/or the worksite 112. In some examples, the worksite plan received at 302 may also include and/or identify one or more travel paths 114. For example, at 302 the system controller 122 may provide one or more known and/or previously-traveled travel paths 114, defined by the work surface 110, to the controller 136. In such examples, such known travel paths 114 may be stored in a memory associated with the system controller 122, and may be part of one or more worksite plans previously generated by the controller 136 and/or by the system controller 122. In any of the examples described herein, the worksite plan received at 302 may include instructions regarding moving material (e.g., the pile 116 of material) from a first location at the worksite 112 (e.g., the location 210 shown in FIG. 2) to a second location at the worksite 112 (e.g., the location 204 shown in FIG. 2).

At 304, the controller 136 may receive sensor information from the location sensor 130 and/or the perception sensor 134. For example, at 304 the location sensor 130 may sense, detect, and/or otherwise determine GPS coordinates, UTS coordinates, and/or other location information indicating the current location of the loading machine 104 on the work surface 110. Additionally, at 304 the perception sensor 134 may sense, detect, and/or otherwise determine at least one of LIDAR data, RADAR data, SONAR data, image data, and/or other sensor information indicative of the work surface 110 and/or other areas of the worksite 112 within the field of view of the one or more sensors of the perception sensor 134. Such sensor information may, for example, indicate the contour and/or other conditions of the work surface 110 at an area between a current location of the loading machine 104 (e.g., the location 208 shown in FIG. 2) and a location of the pile 116 of material (e.g., the location 210). At 304, the location sensor 130 and/or the perception sensor 134 may direct one or more signals to the controller 136 including such sensor information.

In some examples, the sensor information received at 304 may also include environmental information associated with the worksite 112. Such sensor information may be received from the location sensor 130, the perception sensor 134, one or more controllers of other machines located at the worksite 112, the control system 120, and/or from other sources. In such examples, the environmental information may include current, previous, and/or forecasted weather information (e.g., temperature, humidity, precipitation conditions, wind condition, etc.) and/or other environmental conditions associated with the worksite 112. In any of the examples described herein one or more travel paths 114, machine speeds, and/or other travel parameters may be determined by the controller 136 based at least in part on such sensor information. For example, such weather information may be used as a weighting factor, as a constant, and/or as a modifier in one or more algorithms, lookup tables, data curves, neural networks, and/or other components of the controller 136 configured to determine one or more of the travel parameters described herein.

At 306, the controller 136 may determine a first travel parameters, and/or first work tool positions based at least partly on the worksite plan received at 302. For example, at 306 the controller 136 may determine one or more first travel parameters based at least partly on the worksite plan received at 302 and/or based at least partly on various sensor information received at 304. One or more of the first travel parameters determined at 306 may include, among other things, a first travel path (e.g., the travel path 114d shown in FIG. 2) along the work surface 110 of the worksite 112. In such examples, the first travel path 114d may extend from the current location 208 of the loading machine 104 to the location, 210 of the pile 116 of material, and the travel path 114d may comprise a desired route for the loading machine 104 to travel in order to maximize the efficiency of the loading machine 104 as it performs the tasks defined by the worksite plan. For example, the travel path 114d may comprise a most direct route, a best-fit route, and/or other configuration in order to minimize the time and resources required for the loading machine 104 to travel from the current location 208 to the location 210 of the pile 116 of material. In any of the examples described herein, one or more of the travel paths 114 determined by the controller 136 may comprise a drive line disposed within a drive envelope. In such examples, the drive line may extend approximately centrally through the drive envelope, and the drive envelope may define at least part of the travel path (e.g., the travel path 114d) along which the loading machine 104 travels to reach a particular destination (e.g., the location 210). For example, the drive envelope defining the travel path 114d may be approximately as wide as the loading machine 104, and in some examples the drive envelope and/or a substantially central drive line of the drive envelope may be used to determine, a trajectory and/or a series of sequential trajectories along which the loading machine 104 may travel to achieve the desired travel path 114d. Each trajectory of the series of sequential trajectories may be determined by substantially simultaneously generating a plurality of trajectories and selecting one of the trajectories which is best able to achieve the desired travel path 114d. In such examples, respective trajectories, and the resulting travel path 114d defined thereby, may be generated and/or otherwise determined by the controller 136 in accordance with a receding horizon technique and/or other travel path generation technique. Such a technique and/or other travel path generation techniques may utilize one or more algorithms, neural networks, look-up tables, three-dimensional maps, predictive models, and/or other components to generate at least part of the travel path 114d at 306. In some examples, GPS coordinates, UTS coordinates, and/or other location information or coordinates indicating the current location of the loading machine 104 (e.g., the location 208) and the location of the desired destination (e.g., the location 210) may be used by the controller 136 to generate a series of waypoints and/or a series of sequential trajectories corresponding to such waypoints. In such examples, the travel path 114d generated at 306 may comprise a sequence of waypoints and/or trajectories leading from the current location of the loading machine 104 (e.g., the location 208) to the location of the desired destination (e.g., the location 210).

In some examples, in generating one or more of the travel paths 114 described herein, the controller 136 may generate a plurality of sequential trajectories, and each trajectory may comprise a two-dimensional vector or a three-dimensional vector. Such trajectories may be linear trajectories determined using, for example, a linear algorithm (e.g., Y=mX+ b) or some variation thereof in order to direct the loading machine 104 from a current location 108 to the location 210 of the pile 116 of material. Additionally or alternatively, such trajectories may be curvilinear trajectories, or other trajectories determined using one or more corresponding algorithms. For example, the controller 136 may generate a curvilinear trajectory using one or more best-fit curve algorithms (e.g., a second degree polynomial equation: $Y=aX^2+bX+c$; a third degree polynomial equation: $Y=aX^3+bX^2+cX+d$; etc.) or other techniques. Taken together, the sequential trajectories described above may make up one or more of the travel paths 114 described herein. Further, in some examples the various trajectories determined by the controller 136 may be valid and/or useable by the controller 136 for controlling operation of the loading machine 104 for a particular time window (e.g. less than 10 seconds) and/or may be recalculated at a certain frequency (e.g. 10 Hz, 30 Hz, etc.).

With continued reference to FIG. 3, the first travel parameters determined by the controller 136 at 306 may also include first machine speeds corresponding to the first travel path 114d. For example, the controller 136 may generate travel speeds for the loading machine 104 at each point and/or for various sequential sections of the first travel path 114d determined at 306. The controller 136 may determine one or more such travel speeds using predetermined speed limits or other speed requirements associated with the worksite 112. Additionally or alternatively, the controller 136 may utilize previously determined and/or stored machine speeds associated with one or more similar travel paths 114 previously traveled by the loading machine 104 at the worksite 112. In any of the examples described herein, at 306 the controller 136 may determine one or more machine speeds utilizing the algorithm: Distance=(Rate)×(Time) and/ or any other such speed determination techniques.

At 306, the controller 136 may also determine, based at least partly on the worksite plan received at 302, a plurality of first work tool positions associated with the work tool 140 of the loading machine 104. For example, each position of the first work tool positions may comprise one of a loading position, a carrying position, an unloading position, and/or any other position of the work tool 140 relative to the work surface 110 and/or relative to a frame of the loading machine 104. As described above, the controller 136 may control the one or more linkages 142 of the loading machine 104 two position the work tool 140 at such work tool positions. In order to assist the loading machine 104 in performing the one or more tasks defined by the worksite plan received at 302. Additionally, each position of the first work tool positions determined at 306 may correspond to a respective location along the first travel path 114d determined by the controller 136 at 306.

At 308, the controller 136 may control the loading machine 104 in accordance with and/or based at least partly on the first travel parameters and/or the first work tool positions determined at 306. For example, at 308 the controller 136 may control the loading machine 104 to traverse at least part of the first travel path 114d determined at 306. Controlling the loading machine 104 in this way may cause the loading machine 104 to travel, from the current location 208 toward the location 210 of the pile 116, in the direction 220 along at least part of the first travel path 114d. Controlling the loading machine 104 in this way at 308 may also cause the loading machine 104 to travel, along the at least part of the first travel path 114d, at a first machine speed determined at 306 corresponding to the at least part of the first travel path. Additionally, controlling the loading machine 104 in this way at 308 may cause the one or more linkages 142 of the loading machine 104 to dispose the work tool 140 at a corresponding one of the first work tool positions as the loading machine 104 travels along the at least part of the first travel path 114d.

As noted above, the perception sensor 134, the location sensor 130, and/or other sensors of the loading machine 104 may continuously, substantially continuously, and/or intermittently sense portions of the work surface 110 as the loading machine 104 travels along the first travel path 114d. In such examples, the various sensors of the loading machine 104 may provide signals to the controller 136, including sensor information gathered thereby, such that the controller 136 may identify one or more imperfections 118 of the work surface 110 based at least partly on the received sensor information. For example, at 308 the controller 136 may control the perception sensor 134, the location sensor 130, and/or other sensors of the loading machine 104 to observe and/or sense portions of the first travel path 114d that are within the fields of view of the respective sensors as the loading machine 104 traverses the first travel path 114d. At 308, the perception sensor 134, the location sensor 130, and/or other sensors of the loading machine 104 may provide signals to the controller 136 containing sensor information generated by the respective sensors.

At 310, the controller 136 may receive sensor information from the perception sensor 134, the location sensor 130, and/or other sensors of the loading machine 104. In such examples, at least a portion of the sensor information received by the controller 136 at 310 may be indicative of and/or otherwise associated with the work surface 110 defining the first travel path 114d. In some examples, at 310 the controller 136 may also receive additional sensor information from one or more components of the system 100. For example, at 310 the controller 136 may receive sensor information, via the network 124, from perception sensors 134, location sensors 130, and/or other sensors of one or more additional loading machines 104, hauling machines 106, digging machines 102, and/or other components of the system 100. Further, at 310 the controller 136 may receive additional sensor information from the system controller 122 (e.g., stored sensor information) one or more electronic devices 128, and/or other sources connected to the network 124.

In any of the examples described herein, the controller 136 may analyze the sensor information received at 310 in order to determine the presence of and/or identify one or more imperfections 118 of the work surface 110 located along the first travel path 114d. For example, at 312, the controller 136 may predict, estimate, and/or determine whether the loading machine 104 will encounter an imperfection 118 as the loading machine 104 traverses the first travel path 114*d*. In particular, in some examples, the sensor information received at 310 may be indicative of a characteristic of an imperfection 118 disposed along the first travel path 114*d*. Such characteristics may include, among other things, a length, width, height, depth (e.g., a dimension), volume, color, texture, composition, radiation emission, position/location, an orientation, object type (e.g., a classification), velocity, acceleration, and/or other characteristics of the imperfection 118. At 312, the controller 136 may determine whether one or more characteristics of the imperfection 118 satisfies a minimum threshold associated with imperfections. Satisfying one or more such minimum thresholds may indicate that the imperfection 118 is large enough to be considered for clean-up or other modifications by the loading machine 104, while failing to satisfy one or more such minimum thresholds may indicate that the imperfection 118 is too small to be considered for such modifications.

For example, a threshold utilized by the controller 136 at 312 may comprise, among other things, a length threshold associated with a minimum length of an example imperfection, a width threshold associated with a minimum width of an example imperfection, a height threshold associated with a minimum height of an example imperfection, a volume threshold associated with a minimum volume of an example imperfection, and/or any other such minimum threshold or combination thereof. For example, in some embodiments a minimum threshold utilized at 312 may comprise a minimum height threshold having a value of 6 inches above grade. In such examples, if the height of the imperfection 118 (as determined by the controller 136 based at least partly on the sensor information received at 310) has a value that is less than or equal to 6 inches above grade, the controller 136 may determine that such a characteristic of the imperfection 118 fails to satisfy the minimum height threshold (Step: 312—No), and the controller 136 may continue controlling the loading machine 104 as described above with respect to Step: 308. On the other hand, if the height of the imperfection 118 (as determined by the controller 136 based at least partly on the sensor information received at 310) has a value that is greater than 6 inches above grade, the controller 136 may determine that such a characteristic of the imperfection 118 satisfies the minimum height threshold (Step: 312—Yes), and control may proceed to Step: 314. It is understood that in other examples, any other value or threshold may be used by the controller 136, either alone or in combination, to make such determinations at 312.

At 314, the controller 136 may determine, based at least partly on the one or more characteristics of the imperfection 118, whether the imperfection 118 has a positive volume (e.g., that the imperfection 118*a* is one of a mound, build-up, spillage, pile, etc. of material disposed on and/or formed by the work surface 110) or a negative volume (e.g., that the imperfection 118*b* is one of a pothole, rut, ditch, etc. formed by the work surface 110). For example, at 314 the controller 136 may utilize image data, LIDAR data, and/or any other sensor information received at 310 to make such a determination. In such examples, the controller 136 may compare such sensor information to one or more stored images, stored LIDAR data, and/or other components utilized to characterize the identified imperfection 118 as having either a positive volume or a negative volume. In some examples, the controller 136 may utilize image recognition software, one or more neural networks, and/or other machine learning techniques in making such a determination and/or characterization. If the controller 136 determines that the identified imperfection 118 (e.g., the imperfection 118*a* described above with respect to FIG. 2) has a positive volume and/or otherwise comprises a positive-volume imperfection (Step: 314—Yes), control may proceed to Step: 316.

At 316, and based at least partly on determining at 314 that the imperfection 118*a* has a positive volume, the controller 136 may determine whether one or more characteristics of the imperfection 118*a* satisfy a corresponding threshold (e.g., a first threshold) associated with positive-volume imperfections. In such examples, the threshold utilized by the controller 136 for comparison purposes may be different from the threshold described above with respect to, for example, Step: 312.

For example, such a threshold may comprise a length threshold, a width threshold, a height threshold, a volume threshold, and/or any other such threshold or combination thereof. In such examples, determining, at 316, that the one or more characteristics of the imperfection 118*a* satisfy the associated threshold may include determining that the one or more characteristics of the imperfection 118*a* have values that are less than or equal to the associated threshold. For example, in some embodiments the threshold utilized by the controller 136 for comparison purposes at 316 may comprise a volume threshold that corresponds to the struck volume of the work tool 140. Such a volume threshold may comprise, for example, a value equal to ¾ of the struck volume of the work tool 140. In such examples, if the controller 136 determines that the volume of the imperfection 118*a* has a value that is less than or equal to ¾ of the struck volume of the work tool 140 (Step: 316—Yes), the controller 136 may determine that such a characteristic of the imperfection 118*a* satisfies the volume threshold, and control may proceed to Step: 318. By determining that such a volume threshold has been satisfied, the controller 136 may determine that the work tool 140 has the capacity to, load, collect, and/or otherwise cleanup the positive-volume imperfection 118*a* while traveling along the travel path 114*d*. It is understood that in other examples, any other value or threshold may be used by the controller 136 to make such determinations at 316.

At 318, and based at least partly on identifying the imperfection 118*a*, the controller 136 may determine second travel parameters and/or second work tool positions. For example, at 318 the controller 136 may determine one or more second travel parameters based at least partly on the worksite plan received at 302 and/or based at least partly on various sensor information received at 310. One or more of the second travel parameters determined at 318 may include, among other things, a second travel path (e.g., the travel path 114*d'* shown in FIG. 2) along the work surface 110 of the worksite 112. In such examples, the second travel path 114*d'* may extend from the current location 208 of the loading machine 104 to the location 210 of the pile 116 of material, and the travel path 114*d'* may comprise a desired route for the loading machine 104 to travel in order to maximize the efficiency of the loading machine 104 as it performs the tasks defined by the worksite plan. For example, based at least partly on determining that the one or more characteristics of the identified imperfection 118*a* satisfy the corresponding first threshold(s) at 316, the controller 136 may determine a second travel path 114*d'* at 318 that extends substantially entirely along the first travel path 114*d* determined at 306.

The second travel parameters determined by the controller 136 at 318 may also include second machine speeds corresponding to the second travel path 114*d'*. For example, at 318 the controller 136 may generate travel speeds for the loading machine 104 at each point and/or for various sequential sections of the second travel path 114*d*. At 318, the controller 136 may also determine, based at least partly on the worksite plan received at 302 and/or based at least partly on various sensor information received at 310, a plurality of second work tool positions associated with the work tool 140. Each position of the second work tool positions determined at 318 may comprise one of a loading position, a carrying position, an unloading position, and/or any other position of the work tool 140 relative to the work surface 110 and/or relative to a frame of the loading machine 104. Additionally, each position of the second work tool positions determined at 318 may correspond to a respective location along the second travel path 114*d*. The controller 136 may utilize any of the algorithms, neural networks, look-up tables, components, and/or techniques described above with respect to Step: 306 to generate the second travel parameters and/or second work tool positions at 318.

At 320, the controller 136 may control the loading machine 104 to traverse at least part of the travel path 114*d* while positioning the work tool 140 according to at least one of the work tool positions determined at 318. In such examples, at 320 the controller 136 may cause the one or more linkages 142 (FIG. 1) to lower the work tool 140 to the loading position described above. At 320, the controller 136 may control the loading machine 104 to advance along the travel path 114*d* such that the work tool 140 may impact the imperfection 118*a* while in the loading position. For example, at 320 the controller 136 may cause the one or more linkages 142 to lower the work tool 140 to the loading position, at a location 212 along the travel path 114*d*, prior to impacting the imperfection 118*a*. The controller 136 may then cause the one or more linkages 142 to raise the work tool 140, relative to the work surface 110, to the carrying position described above such that material disposed within the open space of the work tool 140 (e.g., at least part of the cleared imperfection 118*a*) may be retained therein as the loading machine 104 is controlled to traverse a remainder of the travel path 114*d* and/or one or more additional travel paths 114 (e.g., the travel path 114*b*).

On the other hand, if the controller 136 determines, at 316, that the one or more characteristics of the imperfection 118*a* fail to satisfy the threshold associated with positive-volume imperfections (Step: 316—No), control may proceed to 322. Such a determination may include determining that the one or more characteristics of the imperfection 118*a* have values that are greater than the associated threshold. By determining that such a volume threshold has not been satisfied, the controller 136 may determine that the work tool 140 does not have the capacity to load, collect, and/or otherwise cleanup the positive-volume imperfection 118*a* while traveling along the travel path 114*d* determined at 306. For instance, in the example above in which the threshold comprises a volume threshold (e.g., ¾ of the struck volume of the work tool 140), if the controller 136 determines, at 316, that the volume of the imperfection 118*a* has a value that is greater than ¾ of the struck volume of the work tool 140 (Step: 316—No), control may proceed to 322.

At 322, the controller 136 may generate and/or provide one or more alerts. Such alerts may be, for example, provided to an operator of the loading machine 104 via a display of the loading machine 104. Additionally or alternatively, at 322 the controller 136 may provide (e.g., via the network 124) one or more such alerts to the system controller 122, an electronic device 128, one or more additional machines of the system 100, and/or to any other components of the control system 120.

At 324, and based at least partly on identifying the imperfection 118*a*, the controller 136 may determine third travel parameters and/or third work tool positions. For example, at 324 the controller 136 may determine one or more third travel parameters based at least partly on the worksite plan received at 302 and/or based at least partly on various sensor information received at 310. One or more of the third travel parameters determined at 324 may include, among other things, a third travel path (e.g., the travel path 114*e* shown in FIG. 2) along the work surface 110 of the worksite 112. In such examples, the third travel path 114*e* may extend from the current location 208 of the loading machine 104 to the location 210 of the pile 116 of material, and the travel path 114*e* may comprise a desired route for the loading machine 104 to travel in order to maximize the efficiency of the loading machine 104 as it performs the tasks defined by the worksite plan. For example, based at least partly on determining that the one or more characteristics of the identified imperfection 118*a* fail to satisfy the corresponding first threshold(s) at 316, the controller 136 may determine a third travel path 114*e* at 324 that is configured such that the loading machine 104 avoids impact with the imperfection 118*a* as the loading machine 104 traverses the travel path 114*e* from the current location 208 to the location 210 of the pile 116.

At 326, the controller 136 may control the loading machine 104 to traverse at least part of the travel path 114*e* while positioning the work tool 140 according to at least one of the work tool positions determined at 324. For example, at 326 the controller 136 may control the loading machine 104 to traverse the travel path 114*e* substantially in the direction 220 toward the pile 116 of material. In such examples, at 326 the controller 136 may cause the one or more linkages 142 (FIG. 1) to maintain the work tool 140 in the carrying position described above until the loading machine 104 reaches a location along the travel path 114*e* proximate the location 210 of the pile 116. When the loading machine 104 reaches such a location, at 326 the controller 136 may control the one or more linkages 142 to lower the work tool 140 to the loading position described above. The controller 136 may also control the loading machine 104 to advance along the travel path 114*e* such that the work tool 140 may impact the pile 116, at the location 210, while in the loading position. The controller 136 may then cause the one or more linkages 142 to raise the work tool 140, relative to the work surface 110, to the carrying position described above such that material disposed within the open space of the work tool 140 (e.g., material removed from the pile 116) may be retained therein as the loading machine 104 is controlled to traverse one or more additional travel paths 114 (e.g., the travel path 114*b*).

With continued reference to FIG. 3, if the controller 136 determines at 314 that the identified imperfection 118 (e.g., the imperfection 118*b* described above with respect to FIG. 2) has a negative volume and/or otherwise comprises a negative-volume imperfection (Step: 314—No), control may proceed to Step: 328. At 328, and based at least partly on determining at 314 that the imperfection 118*b* has a negative volume, the controller 136 may determine whether one or more characteristics of the imperfection 118*b* satisfy one or more corresponding thresholds (e.g., one or more second thresholds) associated with negative-volume imperfections. In such examples, the one or more second thresholds utilized by the controller 136 for comparison purposes at 328 may be different from the thresholds described above with respect to, for example, Step: 312 and Step: 316.

For example, the one or more thresholds utilized by the controller 136 at 328 may comprise a length threshold, a width threshold, a depth threshold, a volume threshold, and/or any other such threshold or combination thereof. In such examples, determining, at 328, that the one or more characteristics of the imperfection 118b satisfy the associated one or more thresholds may include determining that the one or more characteristics of the imperfection 118b have values that are less than or equal to the respective threshold. For example, in some embodiments the one or more thresholds utilized by the controller 136 for comparison purposes at 328 may comprise a width threshold that corresponds to the width of the wheel base of the loading machine 104. Such a width threshold may comprise, for example, a value equal to ½ of the distance between inner surfaces of opposing tires on the loading machine 104. In such examples, if the controller 136 determines, at 328, that the width of the imperfection 118b has a value that is less than or equal to ½ of the distance between inner surfaces of opposing tires on the loading machine 104, the controller 136 may determine that such a characteristic of the imperfection 118b satisfies the width threshold. It is understood that in other examples, any other value or threshold may be used by the controller 136 to make such determinations. By determining that such a width threshold has been satisfied (Step: 328—Yes), the controller 136 may determine that the loading machine 104 may safely cross over the imperfection 118b while traveling along the travel path 114f without causing damage to the loading machine 104 and/or injury to an operator of the loading machine 104. Based at least partly on such a determination, control may proceed to Step: 330. It is understood that in other examples, any other value or threshold may be used by the controller 136 to make such determinations at 328.

At 330, and based at least partly on identifying the imperfection 118b, the controller 136 may determine fourth travel parameters and/or fourth work tool positions. For example, at 330 the controller 136 may determine one or more fourth travel parameters based at least partly on the worksite plan received at 302 and/or based at least partly on various sensor information received at 310. One or more of the fourth travel parameters determined at 330 may include, among other things, a fourth travel path (e.g., the travel path 114f shown in FIG. 2) along the work surface 110 of the worksite 112. In such examples, the fourth travel path 114f may extend from the current location 214 of the loading machine 104 to the location 216 of the pile 116 of material, and the travel path 114f may comprise a desired route for the loading machine 104 to travel in order to maximize the efficiency of the loading machine 104 as it performs the tasks defined by the worksite plan. For example, based at least partly on determining that the one or more characteristics of the identified imperfection 118b satisfy the corresponding first threshold(s) at 328, the controller 136 may determine a fourth travel path 114f at 330 that extends substantially entirely along the travel path 114f In such examples, the travel path 114f may comprise a first travel path determined at 306.

The fourth travel parameters determined by the controller 136 at 330 may also include fourth machine speeds corresponding to the fourth travel path 114f. For example, at 330 the controller 136 may generate travel speeds for the loading machine 104 at each point and/or for various sequential sections of the fourth travel path 114f. At 330, the controller 136 may also determine, based at least partly on the worksite plan received at 302 and/or based at least partly on various sensor information received at 310, a plurality of fourth work tool positions associated with the work tool 140. Each position of the fourth work tool positions determined at 330 may comprise one of a loading position, a carrying position, an unloading position, and/or any other position of the work tool 140 relative to the work surface 110 and/or relative to a frame of the loading machine 104. Additionally, each position of the second work tool positions determined at 330 may correspond to a respective location along the fourth travel path 114f. The controller 136 may utilize any of the algorithms, neural networks, look-up tables, components, and/or techniques described above with respect to Step: 306 to generate the fourth travel parameters and/or fourth work tool positions at 330. As noted above, the fourth travel path 114f may include a first part 218 and a second part 222. In some examples one or both of the first part 218 and the second part 222 may be substantially similar to, substantially the same as, and/or may otherwise extend substantially entirely along the travel path 114f.

At 332, the controller 136 may control the loading machine 104 to traverse at least part of the travel path 114f while positioning the work tool 140 according to at least one of the work tool positions determined at 330. In such examples, at 332 the controller 136 may control the loading machine 104 to traverse the first part 218 of the travel path 114f, while oriented as shown in FIG. 2 relative to the imperfection 118b, and in the direction 220. At 332, the controller 136 may also cause the one or more linkages 142 of the loading machine 104 to lower the work tool 140 to the loading position described above, as the loading machine 104 approaches the pile 116 of material. At 332, the controller 136 may control the loading machine 104 to advance along the travel path 114f such that the work tool 140 may impact the pile 116 of material at the location 216 while the work tool 140 is in the loading position. At 332, the controller 136 may also cause the one or more linkages 142 to raise the work tool 140, relative to the work surface 110, to the carrying position described above such that material disposed within the open space of the work tool 140 (e.g., material removed from the pile 116) may be retained therein.

At 332, the controller 136 may then control the loading machine 104 to travel, in the direction 224, along the second part 222 of the travel path 114f while maintaining the orientation shown in FIG. 2 relative to the imperfection 118b. While traveling in the direction 224 along the second part 222 of the travel path 114f, the controller 136 may control the work tool 140 to transfer material from the work tool 140 to the imperfection 118b. For example, at 332, the controller 136 may control the one or more linkages 142 to lower, pivot, shake, tilt, and/or otherwise move the work tool 140, at the location 226 proximate the imperfection 118b, such that the material carried within the open space of the work tool 140 may be deposited substantially within the negative-volume imperfection 118b. In some examples, controlling the linkages 142 in this way at 332 may dispose the work tool 140 in the unloading position described above.

On the other hand, if the controller 136 determines, at 328, that the one or more characteristics of the imperfection 118b fail to satisfy the one or more thresholds associated with negative-volume imperfections (Step: 328—No), control may proceed to 334. Such a determination may include determining that the one or more characteristics of the imperfection 118b have values that are greater than the one or more associated thresholds. By determining that one or more such thresholds have not been satisfied, the controller 136 may determine that the loading machine 104 may not be capable of safely traversing the travel path 114f due to the depth, width, length, and/or other configuration of the imperfection 118b.

At 334, the controller 136 may generate and/or provide one or more alerts. Such alerts may be, for example, provided to an operator of the loading machine 104 via a display of the loading machine 104. Additionally or alternatively, and similar to the alerts described above with respect to Step: 322, at 334 the controller 136 may provide (e.g., via the network 124) one or more such alerts to the system controller 122, an electronic device 128, one or more additional machines of the system 100, and/or to any other components of the control system 120.

At 336, and based at least partly on identifying the imperfection 118b, the controller 136 may determine fifth travel parameters and/or fifth work tool positions. For example, at 336 the controller 136 may determine one or more fifth travel parameters based at least partly on the worksite plan received at 302 and/or based at least partly on various sensor information received at 310. One or more of the fifth travel parameters determined at 336 may include, among other things, a fifth travel path (e.g., the travel path 114g shown in FIG. 2) along the work surface 110 of the worksite 112. In such examples, the fifth travel path 114g may extend from the current location 214 of the loading machine 104 to the location 216 of the pile 116 of material, and the travel path 114g may comprise a desired route for the loading machine 104 to travel in order to maximize the efficiency of the loading machine 104 as it performs the tasks defined by the worksite plan. For example, based at least partly on determining that the one or more characteristics of the identified imperfection 118b fail to satisfy the corresponding second threshold(s) at 328, the controller 136 may determine a fifth travel path 114g at 336 that is configured such that the loading machine 104 avoids the imperfection 118b as the loading machine 104 traverses the travel path 114g from the current location 214 to the location 216 of the pile 116. In some examples, the travel path 114g may be similar to the travel path 114e described above.

At 338, the controller 136 may control the loading machine 104 to traverse at least part of the travel path 114g while positioning the work tool 140 according to at least one of the work tool positions determined at 336. For example, at 338 the controller 136 may control the loading machine 104 to traverse the travel path 114g substantially in the direction 220 toward the pile 116 of material. In such examples, at 338 the controller 136 may cause the one or more linkages 142 (FIG. 1) to maintain the work tool 140 in the carrying position described above until the loading machine 104 reaches a location along the travel path 114g proximate the location 216 of the pile 116. When the loading machine 104 reaches such a location, at 338 the controller 136 may control the one or more linkages 142 to lower the work tool 140 to the loading position described above. The controller 136 may also control the loading machine 104 to advance along the travel path 114g such that the work tool 140 may impact the pile 116, at the location 216, while in the loading position. The controller 136 may then cause the one or more linkages 142 to raise the work tool 140, relative to the work surface 110, to the carrying position described above such that material disposed within the open space of the work tool 140 (e.g., material removed from the pile 116) may be retained therein as the loading machine 104 is controlled to traverse one or more additional travel paths 114 (e.g., the travel path 114b).

INDUSTRIAL APPLICABILITY

The present disclosure describes systems and methods for controlling various machines, sensors, and/or other components of a system 100 employed at a worksite 112. Such systems and methods may be used to more efficiently coordinate activities of one or more digging machines 102, loading machines 104, hauling machine 106, and/or other components of the system 100 during excavation, mining, construction, paving, and/or other operations at the worksite 112. For example, such systems and methods may enable a controller 136 of a machine (e.g., a loading machine 104) to identify one or more obstacles or imperfections 118 formed by a work surface 110 of the worksite 112 and disposed along one or more travel paths 114 of the machine. In some situations, the systems and methods described herein may control the machine to take corrective action to modify such an imperfection 118 (e.g., clear or smooth over a build-up of material, at least partially fill a ditch, rut, or pothole, etc.) while traversing the travel path, thereby returning the work surface 110 to a substantially flat condition. Thus, the particular machine and/or other machines of the system 100 may continue to traverse the repaired travel path without risking damage to the machine, loss of material carried by a work tool 140 of the machine, or other negative consequences potentially caused by the imperfection 118. Additionally, in examples in which the travel path (e.g., the travel path 114d, 114d' shown in FIG. 2) comprises an optimal or most direct route between the current location of the machine (e.g., the location 208 shown in FIG. 2) and a destination of the machine (e.g., the location 210 shown in FIG. 2), returning the work surface 110 to a substantially flat condition in accordance with the example methods of the present disclosure may enable the machine to avoid traversing suboptimal or less direct routes (e.g., the travel path 114e shown in FIG. 2) between the current location of the machine and the destination.

As a result, the systems and methods of the present disclosure may assist in reducing the time and resources required to perform various tasks at the worksite 112, thereby improving the efficiency of the system 100. The systems and methods of the present disclosure may also reduce the risk of damage to the one or more digging machines 102, loading machines 104, hauling machine 106, and/or other components of the system 100 during operation, while improving safety. As a result, the systems and methods of the present disclosure may reduce downtime, increase productivity of the system 100, and minimize expenses associated with machine repair.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A method, comprising:
   receiving, with a controller, a worksite plan to be executed by a machine at a worksite;
   determining, with the controller and based at least partly on the worksite plan,
      first travel parameters of the machine, the first travel parameters including a first travel path along a work surface of the worksite, and
      first work tool positions associated with a work tool of the machine;

controlling, with the controller, the machine to traverse at least part of the first travel path while positioning the work tool according to at least one of the first work tool positions;
receiving sensor information with the controller, at least a portion of the sensor information being associated with the work surface defining the first travel path;
identifying, with the controller and based at least partly on the sensor information, an imperfection of the work surface located along the first travel path;
determining, with the controller and based at least partly on identifying the imperfection,
  second travel parameters of the machine, the second travel parameters including a second travel path along the work surface, and
  second work tool positions associated with the work tool; and
controlling, with the controller, the machine to traverse at least part of the second travel path while positioning the work tool according to at least one of the second work tool positions.

2. The method of claim 1, wherein the first travel parameters comprise first machine speeds corresponding to the first travel path, and wherein each position of the first work tool positions corresponds to a respective location along the first travel path.

3. The method of claim 1, wherein the sensor information comprises at least one of LIDAR data, RADAR data, SONAR data, image data, and GPS data.

4. The method of claim 1, wherein the worksite plan comprises instructions regarding moving material, with the work tool, from a first location at the worksite to a second location at the worksite.

5. The method of claim 1, wherein:
the sensor information is indicative of a characteristic of the imperfection,
the characteristic comprises at least one of a volume, a dimension, and a location, and
identifying the imperfection comprises determining that the characteristic satisfies a first threshold.

6. The method of claim 5, further comprising:
determining, based on the characteristic, that the imperfection has a positive volume,
based at least partly on determining that the imperfection has the positive volume, determining that the characteristic satisfies a second threshold associated with positive-volume imperfections different from the first threshold, and
determining the second travel parameters based at least partly on determining that the characteristic satisfies the second threshold.

7. The method of claim 6, wherein:
the second travel path extends substantially entirely along the first travel path, and
positioning the work tool according to the at least one of the second work tool positions comprises positioning the work tool such that a leading edge of the work tool is disposed proximate the work surface as the work tool impacts the imperfection.

8. The method of claim 5, further comprising:
determining, based on the characteristic, that the imperfection has a positive volume,
based at least partly on determining that the imperfection has the positive volume, determining that the characteristic fails to satisfy a second threshold associated with positive-volume imperfections different from the first threshold, and
generating an alert based at least partly on determining that the characteristic fails to satisfy the second threshold.

9. The method of claim 8, wherein:
the second travel path extends from a current location of the machine to a location of a pile of material disposed at the worksite, and
the second travel path is configured such that the machine avoids impact with the imperfection as the machine traverses the second travel path from the current location to the location of the pile.

10. The method of claim 5, further comprising:
determining, based on the characteristic, that the imperfection has a negative volume,
based at least partly on determining that the imperfection has the negative volume, determining that the characteristic satisfies a second threshold associated with negative-volume imperfections different from the first threshold, and
determining the second travel parameters based at least partly on determining that the characteristic satisfies the second threshold, wherein:
the at least part of the second travel path comprises a first part of the second travel path extending substantially entirely along the first travel path from a current location of the machine to a location of a pile of material disposed at the worksite, and a second part of the second travel path extending substantially entirely along the first travel path from the location of the pile to the current location, and
controlling the machine to traverse the at least part of the second travel path comprises:
  controlling the machine to travel in a first direction along the first part of the second travel path with a first orientation relative to the imperfection, and
  controlling the machine to travel in a second direction, opposite the first direction, along the second part of the second travel path with the first orientation relative to the imperfection.

11. The method of claim 10, wherein positioning the work tool according to the at least one of the second work tool positions comprises:
positioning the work tool such that a leading edge of the work tool is disposed proximate the work surface as the work tool impacts the pile in the first direction, and
controlling the work tool to transfer material from the work tool to the imperfection as the machine travels, in the second direction, along the second part of the second travel path.

12. The method of claim 5, further comprising:
determining, based on the characteristic, that the imperfection has the negative volume, and
based at least partly on determining that the imperfection has a negative volume, determining that the characteristic fails to satisfy a second threshold associated with negative-volume imperfections different from the first threshold, wherein:
the second travel path extends from a current location of the machine to a location of a pile of material disposed at the worksite, and
the second travel path is configured such that the machine avoids the imperfection as the machine traverses the second travel path from the current location to the location of the pile.

13. A system, comprising:
a machine configured to travel along a work surface of a worksite, the machine having a work tool configured to carry material as the machine travels along the work surface;
a first sensor configured to determine a location of the machine at the worksite;
a second sensor configured to determine one or more characteristics of the work surface as the machine travels along the work surface; and
a controller in communication with the first sensor and the second sensor, the controller being configured to:
 determine a first travel path of the machine along the work surface,
 control the machine to traverse at least part of the first travel path,
 receive sensor information from the first sensor and the second sensor, at least a portion of the sensor information being associated with the work surface defining the first travel path,
 identify an imperfection of the work surface located along the first travel path based at least partly on the sensor information,
 determine a second travel path of the machine along the work surface based at least partly on identifying the imperfection, the second travel path extending, at least in part, from a current location of the machine to a location of a pile of material at the worksite,
 control the machine to traverse at least part of the second travel path,
 determine a plurality of work tool positions associated with the work tool, wherein each position of the plurality of work tool positions corresponds to a respective location along the second travel path, and
 control the machine to position the work tool according to the plurality of work tool positions as the machine travels along the second travel path.

14. The system of claim 13, wherein:
the first sensor, the second sensor, and the controller are carried by the machine,
the first sensor comprises a GPS device, and
the second sensor comprises at least one of a LIDAR sensor, a RADAR sensor, a SONAR sensor, and an imaging device.

15. The system of claim 13, further comprising:
a wireless communication device in communication with the controller and connected to a network; and
a control system, comprising one or more processors, in communication with the controller via the network and the wireless communication device, wherein the controller is configured to:
 receive, from the control system and via the network, a worksite plan to be executed by the machine, and
 determine the first travel path based at least partly on the worksite plan.

16. The system of claim 13, wherein:
the sensor information is indicative of a characteristic of the imperfection,
the characteristic comprises at least one of a volume, a dimension, and a location, and
identifying the imperfection comprises determining that the characteristic satisfies a first threshold, the controller being further configured to:
 determine, based on the characteristic, that the imperfection has one of a positive volume or a negative volume, and
 based at least partly on determining that the imperfection has the one of the positive volume, determine that the characteristic satisfies a second threshold associated with positive-volume imperfections different from the first threshold, or
 based at least partly on determining that the imperfection has the one of the negative volume, determine that the characteristic satisfies a third threshold associated with negative-volume imperfections different from the first threshold and the second threshold.

17. A system, comprising:
a machine configured to travel along a work surface of a worksite, the machine having a work tool configured to carry material as the machine travels along the work surface;
a sensor carried by the machine and configured to determine one or more characteristics of the work surface as the machine travels along the work surface;
a controller carried by the machine and in communication with the sensor;
a wireless communication device carried by the machine, in communication with the controller, and connected to a network; and
a control system, comprising one or more processors, in communication with the controller via the network and the wireless communication device, the controller being configured to:
 receive, from the control system and via the network, a worksite plan to be executed by the machine, the worksite plan identifying a location of a pile of material disposed at the worksite,
 receive sensor information from the sensor, at least a portion of the sensor information being associated with a first travel path of the machine along the work surface, the first travel path extending, at least in part, from a current location of the machine to the location of the pile,
 identify an imperfection of the work surface located along the first travel path based at least partly on the sensor information,
 determine a second travel path of the machine along the work surface based at least partly on identifying the imperfection, the second travel path extending, at least in part, from the current location of the machine to the location of the pile,
 control the machine to traverse at least part of the second travel path,
 determine a plurality of work tool positions associated with the work tool, wherein each position of the plurality of work tool positions corresponds to a respective location along the second travel path, and
 control the machine to position the work tool according to the plurality of work tool positions as the machine travels along the second travel path.

18. The system of claim 17, wherein the controller is further configured to:
determine, based on the sensor information, that the imperfection has one of a positive volume or a negative volume, and
based at least partly on determining that the imperfection has the one of the positive volume, determine that a characteristic of the imperfection has a value that satisfies a first threshold associated with positive-volume imperfections, or
based at least partly on determining that the imperfection has the one of the negative volume, determine that the characteristic satisfies a second threshold associated with negative-volume imperfections different from the first threshold.

* * * * *